United States Patent
Murase et al.

(10) Patent No.: US 10,214,182 B2
(45) Date of Patent: Feb. 26, 2019

(54) IN-VEHICLE COMMUNICATION SYSTEM, VEHICLE CONTROL DEVICE, AND COMMUNICATION MANAGEMENT DEVICE

(71) Applicants: Tomohiro Murase, Gifu (JP); Naoyuki Ishihara, Aichi (JP); Yosuke Tomita, Aichi (JP)

(72) Inventors: Tomohiro Murase, Gifu (JP); Naoyuki Ishihara, Aichi (JP); Yosuke Tomita, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 15/912,462

(22) Filed: Mar. 5, 2018

(65) Prior Publication Data

US 2018/0281748 A1 Oct. 4, 2018

(30) Foreign Application Priority Data

Mar. 31, 2017 (JP) .................................. 2017-070082

(51) Int. Cl.
*B60R 1/00* (2006.01)
*B60R 25/30* (2013.01)
*G06F 21/51* (2013.01)
*H04W 4/48* (2018.01)

(52) U.S. Cl.
CPC .......... *B60R 25/307* (2013.01); *B60R 25/302* (2013.01); *G06F 21/51* (2013.01); *H04W 4/48* (2018.02)

(58) Field of Classification Search
CPC ...... B60R 25/307; B60R 25/302; H04W 4/48; G06F 21/51

USPC ...... 340/426.12, 441, 426.1, 425.5; 701/117, 701/119
See application file for complete search history.

(56) References Cited

U.S. PATENT DOCUMENTS

| 8,306,521 | B2 | 11/2012 | Ban |
| 10,017,155 | B1* | 7/2018 | Allouche .............. B60R 25/102 |
| 2017/0346878 | A1* | 11/2017 | Baker .................. H04B 1/3822 |
| 2017/0347002 | A1* | 11/2017 | Baker .................... H04N 5/232 |

FOREIGN PATENT DOCUMENTS

| JP | 2008-276663 A | 11/2008 |
| JP | 2013-141947 A | 7/2013 |
| JP | 2013-141948 A | 7/2013 |

* cited by examiner

*Primary Examiner* — Daryl Pope
(74) *Attorney, Agent, or Firm* — Osha Liang LLP

(57) ABSTRACT

An in-vehicle communication system includes: a plurality of local ECUs (vehicle control devices) connected to networks of buses, and configured to control an in-vehicle device; an OBDII port which is a communication port to an outside; and an illicit act detection sensor configured to detect an illicit act on a vehicle. Each local ECU includes a reprogramming receiver and a reprogramming controller. The reprogramming receiver receives a reprogramming request signal and reprogramming data from a reprogramming device connected to the OBDII port. Reprogramming for rewriting a software program of a target local ECU is executed according to the reprogramming request signal and the reprogramming data. When the illicit act detection sensor detects an illicit act, the reprogramming controller prohibits execution of reprogramming.

10 Claims, 13 Drawing Sheets

In-vehicle communication system
103

IN-VEHICLE COMMUNICATION SYSTEM, VEHICLE CONTROL DEVICE, AND COMMUNICATION MANAGEMENT DEVICE

CROSS-REFERENCE TO RELATED APPLICATION

This application is based on Japanese Patent Application No. 2017-070082 filed with the Japan Patent Office on Mar. 31, 2017, the entire contents of which are incorporated herein by reference.

FIELD

The disclosure relates to an in-vehicle communication system having a reprogramming function of rewriting a software program of a vehicle control device connected to a network of a vehicle.

BACKGROUND

For example, a plurality of vehicle control devices is mounted on a vehicle such as a four-wheeled automobile or a motorcycle. The vehicle control device is configured of an electronic control unit (ECU). Each vehicle control device is connected to a predetermined node of a network configured in a vehicle such as a controller area network (CAN) or a local interconnect network (LIN). Each vehicle control device transmits and receives information necessary for controlling an in-vehicle device to be controlled to and from another vehicle control device. Then, the vehicle control devices communicate with each other to operate cooperatively.

A communication management device that manages communication between the vehicle control devices may be connected to the network of the vehicle. The communication management device also communicates with each vehicle control device.

In addition, in a case where a plurality of networks is configured in a vehicle, a communication management device may be connected to the plurality of networks, and vehicle control devices connected to different networks may communicate with each other via the communication management device. Specifically, upon communication between the vehicle control devices connected to different networks, the communication management device filters information received from the vehicle control device on one of the networks, and transfers the information to the vehicle control device on the other network or excludes (does not transmit) the information. In addition, in a case where a communication protocol of one network and a communication protocol of the other network differ from each other, the communication management device converts the communication protocol of information during communication between the vehicle control devices across the networks.

Filtering processing and/or communication protocol conversion processing executed by such a communication management device are collectively referred to as gateway processing. The communication management device is also configured of an ECU. The communication management device is referred to as a gateway device, a gateway ECU, a communication management ECU, or the like. In contrast, the vehicle control device is referred to as a local device, a local ECU, or the like.

There is an in-vehicle communication system having a reprogramming function of rewriting a software program of a vehicle control device without detaching the vehicle control device from a vehicle (hereinafter, "reprogramming" may be abbreviated as "repro" for the sake of convenience). Specifically, a communication port which is a communication port to an outside is provided in a network of a vehicle, a vehicle control device, or a communication management device. Then, an external device for reprogramming is connected to the communication port, the external device transmits a reprogramming request signal or data to the vehicle control device, and reprogramming of the vehicle control device is executed.

However, there is a problem that a person having an intention to perform an illicit act (hereinafter referred to as an "illicit person") connects an illicit device to the communication port, causes the illicit device to transmit an illicit reprogramming request signal and data, and illicitly reprograms the vehicle control device. If the vehicle control device is illicitly reprogrammed, the vehicle control device or the vehicle malfunctions, and therefore there is a risk of theft or the like.

In contrast, JP 2008-276663 A discloses that when a vehicle control device receives a rewrite command, the vehicle control device inquires of a rewriting execution station whether a request signal is legitimate. The rewriting execution station is a distribution source of the request signal. When the vehicle control device inquires, the rewriting execution station searches for a rewrite command distribution history of the rewriting execution station and gives a reply to the vehicle control device, the reply indicating presence or absence of the distribution history. According to the reply, the vehicle control device determines whether or not the rewrite command is legitimate. When the vehicle control device determines that the rewrite command is not legitimate, the vehicle control device prohibits execution of reprogramming based on the rewrite command.

In addition, JP 2013-141947 A discloses that in a case where a gateway (GW)-ECU receives reprogramming data via an authorized on board diagnosis second generation (OBDII) port, the GW-ECU transfers the reprogramming data to a target ECU. In contrast, in a case where an illicit device sends illicit reprogramming data to a network of a vehicle without via the OBDII port and the GW-ECU receives the illicit reprogramming data via the network of the vehicle, the GW-ECU transmits a mandatory command to the target ECU in order to disable reception of the illicit reprogramming data.

In addition, JP 2013-141948 A discloses that when a GW-ECU receives a reprogramming request signal via a communication port, the GW-ECU collates an identification code included in the reprogramming request signal with a registration code registered in advance. If the identification code and the registration code match, the GW-ECU transfers the reprogramming request signal to a target vehicle control device. If the identification code and the registration code do not match, the GW-ECU prohibits transfer of the reprogramming request signal only for a predetermined period.

According to the known techniques, for example, in a case where an illicit person uses an illicit device to transmit false information to a vehicle control device, the false information indicating that there is a reprogramming request signal distribution history, or the like, illicit reprogramming of the vehicle control device cannot be prevented. In addition, also in a case where an illicit person connects an illicit device to an authorized communication port such as an OBDII port, illicit reprogramming of the vehicle control device cannot be prevented. Furthermore, also in a case where an illicit person steals authentication information such as an authentication code included in an authorized reprogramming request signal and the authentication information is included in an illicit request signal, illicit reprogramming of the vehicle control device cannot be prevented.

SUMMARY

An object of the disclosure is to prevent illicit reprogramming of a vehicle control device.

An in-vehicle communication system according to one or more embodiments of the disclosure includes: a plurality of vehicle control devices connected to a network of a vehicle, configured to communicate with each other, and configured to control an in-vehicle device to be controlled; a communication port which is a communication port to an outside; and a reprogramming receiver configured to receive a reprogramming request signal and data from an external device connected to the communication port. Reprogramming for rewriting a software program of a target vehicle control device from among the plurality of vehicle control devices is executed according to the reprogramming request signal and the data received by the reprogramming receiver. The in-vehicle communication system further includes: an illicit act detector configured to detect an illicit act on the vehicle; and a reprogramming controller configured to prohibit execution of the reprogramming when the illicit act detector detects the illicit act.

A vehicle control device according to one or more embodiments of the disclosure is each of a plurality of vehicle control devices connected to a network of a vehicle, communicating with each other, and controlling an in-vehicle device to be controlled. The vehicle control device includes a reprogramming receiver configured to receive a reprogramming request signal and data from an external device connected to a communication port, which is a communication port to the outside, and executes reprogramming for rewriting a software program of the vehicle control device according to the reprogramming request signal and the data received by the reprogramming receiver. The vehicle control device further includes a reprogramming controller configured to prohibit execution of the reprogramming when an illicit act detector provided on the vehicle detects an illicit act on the vehicle.

A communication management device according to one or more embodiments of the disclosure is a communication management device connected to a network of a vehicle, communicating with a plurality of vehicle control devices connected to the network, transferring a signal received from one of the plurality of vehicle control devices to another of the plurality of vehicle control devices, and managing communication between the plurality of vehicle control devices. The communication management device includes a reprogramming receiver configured to receive a request signal and data for executing reprogramming for rewriting a software program of each of the plurality of vehicle control devices from an external device connected to a communication port which is a communication port to an outside. The communication management device transfers the request signal and the data received by the reprogramming receiver to each of the plurality of vehicle control devices. When an illicit act detector provided in the vehicle detects an illicit act on the vehicle, the communication management device destroys the request signal and the data received by the reprogramming receiver without transferring the request signal and the data to each of the plurality of vehicle control devices in order to prohibit execution of the reprogramming.

According to one or more embodiments of the disclosure, when the illicit act detector detects an illicit act on the vehicle, reprogramming of the vehicle control device is not executed. Therefore, for example, when an illicit person performs an illicit act on the vehicle in order to intrude into the vehicle, the illicit act detector detects the illicit act. Even if the illicit person connects an illicit device to the communication port and uses the illicit device to transmit an illicit reprogramming request signal and data imitating an authorized reprogramming request signal and data, reprogramming of the vehicle control device is not executed. Therefore, illicit reprogramming of the vehicle control device can be prevented.

According to one or more embodiments of the disclosure, the in-vehicle communication system may further include a reprogramming authenticator configured to perform authentication according to authentication information included in the reprogramming request signal received by the reprogramming receiver. The reprogramming controller prohibits execution of the reprogramming when the reprogramming authenticator does not succeed in authentication. The reprogramming controller allows execution of the reprogramming when the illicit act detector does not detect the illicit act and the reprogramming authenticator succeeds in authentication.

In addition, according to one or more embodiments of the disclosure, in the in-vehicle communication system, the communication port may be connected to one of the network and each of the plurality of vehicle control devices. The reprogramming receiver, the reprogramming controller, and the reprogramming authenticator may be provided in each of the plurality of vehicle control devices. The illicit act detector may be connected to a specific vehicle control device from among the plurality of vehicle control devices. When the illicit act detector detects the illicit act, the specific vehicle control device may set an illicitness detection flag in a storage inside and may transmit an illicitness detection notification indicating that the illicit act is detected to another of the plurality of vehicle control devices via the network. When the other of the plurality of vehicle control devices receives the illicitness detection notification, the other vehicle control device may set the illicitness detection flag in a storage inside. Then, when the reprogramming receiver receives the reprogramming request signal, in a state where one of a condition that the illicitness detection flag is set and a condition that the reprogramming authenticator does not succeed in authentication is satisfied, each of the plurality of vehicle control devices may cause the reprogramming controller to prohibit execution of the reprogramming. In a state where the illicitness detection flag is not set and the reprogramming authenticator succeeds in authentication, each of the plurality of vehicle control devices may allow the reprogramming controller to execute the reprogramming and may execute the reprogramming according to the reprogramming request signal and the data received by the reprogramming receiver.

According to one or more embodiments of the disclosure, the in-vehicle communication system may further include a communication management device connected to the network, configured to communicate with each of the plurality of vehicle control devices, configured to transfer a signal received from one of the plurality of vehicle control devices to another of the plurality of vehicle control devices, and configured to manage communication between the plurality of vehicle control devices. The communication port may be connected to the communication management device. The reprogramming receiver may be provided in the communication management device and each of the plurality of vehicle control devices. The reprogramming controller and the reprogramming authenticator may be provided in each of the plurality of vehicle control devices. The illicit act detector may be connected to a specific vehicle control device from among the plurality of vehicle control devices. When the illicit act detector detects the illicit act, the specific vehicle control device may transmit an illicitness detection notification indicating that the illicit act is detected to the communication management device via the network. When the communication management device receives the illicitness detection notification, the communication management device may set an illicitness detection flag in a storage inside. When the reprogramming receiver receives the reprogramming request signal, in a state where the illicitness detection flag is set, the communication management device may destroy the reprogramming request signal and the data received by the reprogramming receiver. In a state where the illicitness detection flag is not set, the communication management device may transfer the reprogramming request signal and the data received by the reprogramming receiver to each of the plurality of vehicle control devices via the network. When the reprogramming receiver receives the reprogramming request signal from the communication management device, in a state where the reprogramming authenticator does not succeed in authentication, each of the plurality of vehicle control devices may cause the reprogramming controller to prohibit execution of the reprogramming. In a state where the reprogramming authenticator succeeds in authentication, each of the plurality of vehicle control devices may allow the reprogramming controller to execute the reprogramming and may execute the reprogramming according to the reprogramming request signal and the data received by the reprogramming receiver.

According to one or more embodiments of the disclosure, in the in-vehicle communication system, a power supply of the vehicle may be switched from off to on according to one of an operation of a power switch provided in the vehicle and a signal of an electronic key registered in the vehicle. The in-vehicle communication system may further include a power supply detector configured to detect an on state and an off state of the power supply of the vehicle. When the power supply detector detects the off state of the power supply of the vehicle, the reprogramming receiver may be disabled. When the power supply detector detects the on state of the power supply of the vehicle, the reprogramming receiver may be enabled.

According to one or more embodiments of the disclosure, in the in-vehicle communication system, the illicit act detector may detect the illicit act on the vehicle with a possibility of theft.

According to one or more embodiments of the disclosure, in the in-vehicle communication system, the illicitness detection flag which is set may be automatically cleared upon satisfaction of a predetermined cancellation condition.

According to the disclosure, illicit reprogramming of the vehicle control device can be prevented.

DETAILED DESCRIPTION

Figure 1:
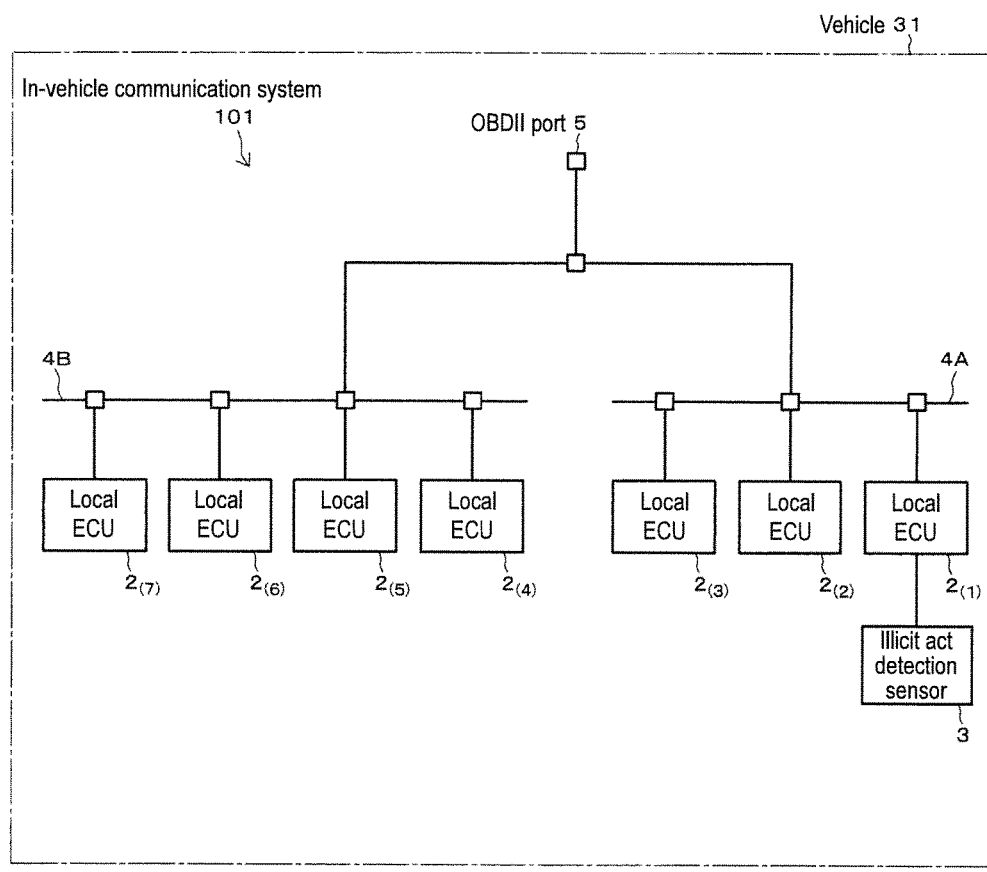
FIG. 1 is a configuration diagram of an in-vehicle communication system according to one or more embodiments of the disclosure.

Hereinafter, embodiments of the disclosure will be described with reference to the drawings. In the drawings, identical or corresponding parts are denoted by identical reference signs. In embodiments of the disclosure, numerous specific details are set forth in order to provide a more through understanding of the invention. However, it will be apparent to one of ordinary skill in the art that the invention may be practiced without these specific details. In other instances, well-known features have not been described in detail to avoid obscuring the invention.

First, a configuration of an in-vehicle communication system 101 according to a first embodiment will be described with reference to FIGS. 1 and 2.

FIG. 1 is a configuration diagram of the in-vehicle communication system 101. The in-vehicle communication system 101 is mounted on a vehicle 31 configured of, for example, a four-wheeled automobile. The in-vehicle communication system 101 includes a plurality of local ECUs $2_{(1)}$ to $2_{(7)}$, an illicit act detection sensor 3, and an on board diagnosis second generation (OBDII) port 5. Hereinafter, the local ECUs $2_{(1)}$ to $2_{(7)}$ are collectively referred to as local ECUs 2.

A plurality of bus type networks such as a controller area network (CAN) and a local interconnect network (LIN) is configured in the vehicle 31. The plurality of local ECUs 2 is connected to the network of each of the buses 4A, 4B.

For example, in FIG. 1, the local ECUs $2_{(1)}$ to $2_{(3)}$ are connected to predetermined connection nodes provided in the network of the bus 4A, respectively. The local ECU $2_{(4)}$ to $2_{(7)}$ are connected to predetermined connection nodes provided in the network of the bus 4B, respectively.

Each local ECU 2 controls each unit of the vehicle 31. More specifically, the local ECUs $2_{(2)}$ to $2_{(7)}$ are allocated to in-vehicle devices to be controlled such as an airbag, an air conditioner, a brake, a transmission, an engine, and a power steering device mounted on the vehicle 31, respectively. Each of the local ECUs $2_{(2)}$ to $2_{(7)}$ controls operation of the corresponding in-vehicle device.

The local ECU $2_{(1)}$ is configured of a body control module (BCM), for example, and controls operation of other in-vehicle devices mounted on the vehicle 31. In addition, the local ECU $2_{(1)}$ monitors, for example, the power supply state and the security state of the vehicle 31, the door locked and unlocked states, and wirelessly communicates with a portable device 60 (FIG. 3) registered in the vehicle 31.

The illicit act detection sensor 3 is connected to the local ECU $2_{(1)}$. The illicit act detection sensor 3 is configured of, for example, an inclination sensor which detects inclination of the vehicle 31, and detects an illicit act on the vehicle 31 which may be a theft of the vehicle 31.

Specifically, for example, when the vehicle 31 is in a stopped state (a traveling drive source such as an engine is also in a stopped state) and an illicit person performs an illicit act on the vehicle 31 such as attempting to intrude into the vehicle 31 and forcibly releasing a door lock, the vehicle 31 shakes. Then, the illicit act detection sensor 3 detects inclination of the vehicle 31, and thus detects the illicit act on the vehicle 31 and outputs the detection result to the specific local ECU $2_{(1)}$.

Each local ECU 2 performs communication, and transmits and receives information necessary for controlling operation of the in-vehicle device to and from another local ECU 2. In addition, the local ECUs 2 communicate with each other to operate cooperatively. The local ECU 2 is an example of a "vehicle control device" according to one or more embodiments of the disclosure. In addition, the local ECU $2_{(1)}$ is an example of a "specific vehicle control device" according to one or more embodiments of the disclosure. The illicit act detection sensor 3 is an example of an "illicit act detector" according to one or more embodiments of the disclosure.

The OBDII port 5 is connected to the buses 4A, 4B. The OBDII port 5 is a communication port to the outside. An external device such as a fault diagnosis device (not illustrated), or a reprogramming device 50 illustrated in FIG. 2 is connected to the OBDII port 5 via a connector or a cable. By connecting the external device to the OBDII port 5, the external device and the local ECU 2 can communicate via the network of the bus 4A, 4B. Specifically, for example, the fault diagnosis device communicates with each local ECU 2 via the network of the bus 4A, 4B, and can acquire fault diagnosis information of the in-vehicle device from the local ECU 2. The OBDII port 5 is an example of a "communication port" according to one or more embodiments of the disclosure.

Figure 2:
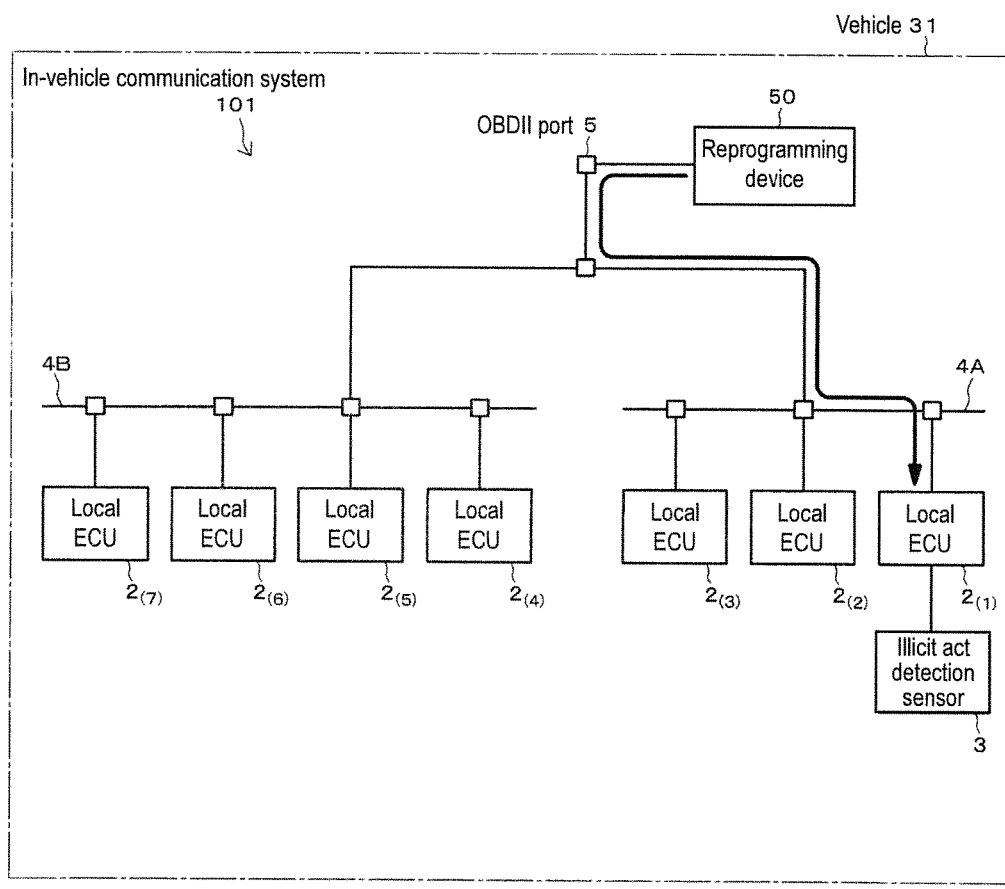
FIG. 2 is a configuration diagram upon reprogramming of the in-vehicle communication system illustrated in FIG. 1.

FIG. 2 is a configuration diagram upon reprogramming of the in-vehicle communication system 101. The reprogramming device 50 illustrated in FIG. 2 is an authorized device configured to execute reprogramming for rewriting a software program of each local ECU 2. By connecting the reprogramming device 50 to the OBDII port 5, the reprogramming device 50 and the local ECU 2 can communicate with each other via the OBDII port 5 and the network of the bus 4A, 4B.

The reprogramming device 50 transmits a reprogramming request signal and data from the OBDII port 5 through each of the buses 4A, 4B. Hereinafter, the reprogramming request signal is referred to as a repro request signal, and the reprogramming data is referred to as repro data.

Each local ECU 2 receives the repro request signal and the repro data transmitted through the bus 4A, 4B connected to each local ECU 2. Then, according to information included in the repro request signal, each local ECU 2 determines whether or not the local ECU 2 itself is a reprogramming target. The local ECU 2 that determines that the local ECU 2 itself is the reprogramming target executes reprogramming according to the repro request signal and repro data received by the local ECU 2.

In FIG. 2, an arrow indicates a reprogramming path from the reprogramming device 50 to the local ECU $2_{(1)}$ as a representative example.

Next, the configuration of the local ECU 2 of the in-vehicle communication system 101 will be described with reference to FIG. 3.

Figure 3:
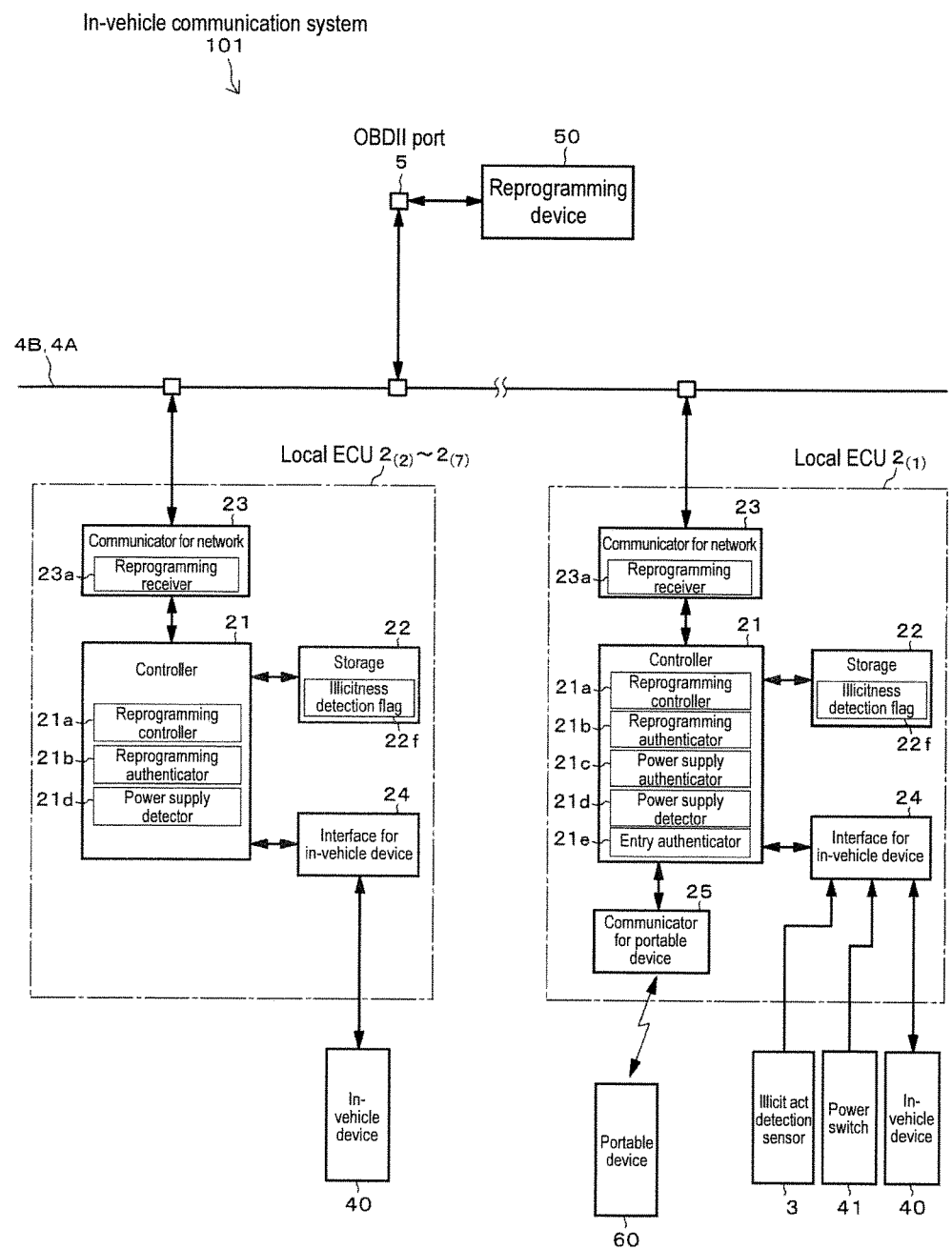
FIG. 3 is a configuration diagram of local ECUs illustrated in FIG. 1.

FIG. 3 is a configuration diagram of the local ECUs 2 of the in-vehicle communication system 101. FIG. 3 separately illustrates the configuration of the local ECU $2_{(1)}$ and the configuration of each of the other local ECUs $2_{(2)}$ to $2_{(7)}$.

Each local ECU 2 includes a controller 21, a storage 22, a communicator 23 for a network, and an interface 24 for an in-vehicle device. In addition to the above configuration, the local ECU $2_{(1)}$ includes a communicator 25 for a portable device.

The controller 21 is configured of a CPU, a memory, and the like. The controller 21 controls operation of an in-vehicle device 40 to be controlled. Each local ECU 2 may control one in-vehicle device 40 or may control a plurality of in-vehicle devices 40.

The controller 21 of each local ECU 2 includes a reprogramming controller 21a, a reprogramming authenticator 21b, and a power supply detector 21d. In addition to the above configuration, the controller 21 of the local ECU $2_{(1)}$ includes a power supply authenticator 21c and an entry authenticator 21e.

The storage 22 is configured of a nonvolatile memory. The storage 22 stores in advance information on the network of each of the buses 4A, 4B, and a software program, information, and the like for operating the local ECU 2 including the storage 22. The software program stored in the storage 22 is necessary for controlling the in-vehicle device 40 to be controlled, and can be rewritten by the reprogramming device 50. The controller 21 reads information from the storage 22 and stores information in the storage 22. In addition, the controller 21 executes reprogramming for rewriting the software program stored in the storage 22 according to the repro request signal and the repro data that the controller 21 receives from the reprogramming device 50.

In a predetermined storage area of the storage 22, an illicitness detection flag 22f is provided for recording that there has been an illicit act on the vehicle 31. The controller 21 sets or clears the illicitness detection flag 22f.

The communicator 23 for a network is configured of a circuit for communicating over the network of the bus 4A or the bus 4B. The controller 21 of each local ECU 2 causes the communicator 23 for a network to transmit and receive a signal (including data and information) or the like to and from another local ECU 2 via the network of the bus 4A, 4B. In addition, the controller 21 causes the communicator 23 for a network to transmit and receive a signal or the like to and from the external device connected to the OBDII port 5 via the OBDII port 5 and the network of the bus 4A, 4B.

The communicator 23 for a network includes a reprogramming receiver 23a. As illustrated in FIG. 2, the controller 21 causes the reprogramming receiver 23a to receive the repro request signal and the repro data from the reprogramming device 50 connected to the OBDII port 5 via the OBDII port 5 and the network of the bus 4A, 4B. In addition, the controller 21 can also cause the communicator 23 for a network to transmit a signal or the like to the reprogramming device 50 via the network of the bus 4A, 4B and the OBDII port 5.

The interface 24 for an in-vehicle device is configured of a circuit for communicating with the in-vehicle device 40 to be controlled. In addition to the in-vehicle device 40, the illicit act detection sensor 3 and a power switch 41 are also connected to the interface 24 for an in-vehicle device of the local ECU $2_{(1)}$. The local ECU $2_{(1)}$ receives the detection result of the illicit act detection sensor 3 and an output signal corresponding to the operation of the power switch 41 through the interface 24 for an in-vehicle device. The illicit act detection sensor 3 and the power switch 41 are also examples of the in-vehicle devices.

The communicator 25 for a portable device of the local ECU $2_{(1)}$ is configured of a circuit for wirelessly communicating with the portable device 60 registered in the vehicle 31. The portable device 60 is an example of an "electronic key" according to one or more embodiments of the disclosure.

In the controller 21 of each local ECU 2, the reprogramming controller 21a allows or prohibits execution of reprogramming of the software program stored in the storage 22. The reprogramming authenticator 21b performs authentication according to the authentication information included in the repro request signal received by the reprogramming receiver 23a. More specifically, the reprogramming authenticator 21b collates the authentication code included in the repro request signal with the registration code registered in advance, and determines that authentication has succeeded when the authentication code and the registration code match. In addition, if the authentication code and the registration code do not match, the reprogramming authenticator 21b determines that the authentication has not succeeded.

The power supply detector 21d detects on and off states of the power supply of the vehicle 31 according to an operation state of a relay on a power supply line (not illustrated) of the vehicle 31. Specifically, an accessory (ACC) relay is provided on an ACC power supply line of the vehicle 31. When the ACC relay is turned on or off, the ACC power supply line is connected or disconnected, and therefore an ACC power supply is turned on or off. In addition, an ignition (IG) relay is provided on an IG power supply line of the vehicle 31. When the IG relay is turned on or off, the IG power supply line is connected or disconnected, and therefore an IG power supply is turned on or off. The power supply detector 21d monitors on and off states of the ACC relay and the IG relay, and detects the on and off states of the ACC power supply and the IG power supply of the vehicle 31. The controller 21 of the local ECU $2_{(1)}$ controls switching on and off of the ACC relay and the IG relay.

The power supply authenticator 21c provided in the controller 21 of the local ECU $2_{(1)}$ performs authentication for turning on the ACC power supply or the IG power supply of the vehicle 31. The ACC power supply and the IG power supply of the vehicle 31 are switched from off to on according to an on-operation of the power switch 41 provided in a passenger compartment of the vehicle 31 or a power-on signal from the portable device 60 registered in the vehicle 31.

For example, when an ACC-on operation or an IG-on operation is performed by the power switch 41 provided in the passenger compartment of the vehicle 31 in a state where the portable device 60 is in the passenger compartment, the controller 21 of the local ECU $2_{(1)}$ causes the communicator 25 for a portable device to communicate with the portable device 60. Then, according to the authentication information included in the signal that the communicator 25 for a portable device receives from the portable device 60, the power supply authenticator 21c performs authentication.

At that time, the power supply authenticator 21c collates the authentication information (ID) of the portable device included in the signal received from the portable device 60 with the registered ID registered in advance. If the ID of the portable device and the registered ID match, the power supply authenticator 21c determines that authentication has succeeded. In this case, the controller 21 of the local ECU $2_{(1)}$ switches the ACC relay or the IG relay from off to on and turns on the ACC power supply or the IG power supply of the vehicle 31. In addition, if the ID of the portable device does not match the registered ID, the power supply authenticator 21c determines that the authentication has not succeeded. In this case, the ACC relay or the IG relay described above remains in the off state, and the ACC power supply or the IG power supply of the vehicle 31 also remains in the off state.

In addition, for example, also when the communicator 25 for a portable device of the local ECU $2_{(1)}$ receives a power-on signal transmitted from the portable device 60 in a state where the portable device 60 is outside the passenger compartment of the vehicle 31, the power supply authenticator 21c performs authentication as described above according to the ID of the portable device 60 included in the power-on signal and the registered ID. Then, according to the authentication result obtained by the power supply authenticator 21c, the controller 21 of the local ECU $2_{(1)}$ controls the on and off states of the ACC power supply or the IG power supply of the vehicle 31 as described above.

The entry authenticator 21e provided in the controller 21 of the local ECU $2_{(1)}$ authenticates the portable device 60 when a user enters (approaches or contacts) the vehicle 31. More specifically, for example, when a passive request switch (not illustrated) provided in the vehicle 31 is operated in a state where the door of the vehicle 31 is locked, the controller 21 of the local ECU $2_{(1)}$ causes the communicator 25 for a portable device to communicate with the portable device 60. Then, according to the authentication information included in the signal that the communicator 25 for a portable device receives from the portable device 60, the entry authenticator 21e performs authentication.

At that time, the entry authenticator 21e collates the ID of the portable device 60 included in the signal received from the portable device 60 with the registered ID registered in advance. The entry authenticator 21e determines that authentication has succeeded when the ID of the portable device 60 and the registered ID match. In this case, the controller 21 of the local ECU $2_{(1)}$ controls a door lock device (not illustrated) to unlock the door of the vehicle 31. In addition, if the ID of the portable device 60 and the registered ID do not match, the entry authenticator 21e determines that the authentication has not succeeded. In this case, the door of the vehicle 31 remains locked.

In addition, for example, also when the communicator 25 for a portable device receives a request signal from the portable device 60 in a state where the door of the vehicle 31 is locked, the entry authenticator 21e authenticates the portable device 60 as described above according to the ID of the portable device 60 included in the request signal and the registered ID. Then, according to the authentication result obtained by the entry authenticator 21e, the controller 21 of the local ECU $2_{(1)}$ controls locking and unlocking of the door of the vehicle 31 as described above.

A legitimate user of the vehicle 31 carries the portable device 60. Therefore, in a case where the power supply authenticator 21c or the entry authenticator 21e succeeds in authentication, it can be determined that the legitimate user is about to use the vehicle 31. In contrast, in a case where the power supply authenticator 21*c* or the entry authenticator 21*e* has not succeeded in authentication, it can be determined that an illicit person not carrying the portable device 60 is trying to illicitly use the vehicle 31.

Next, operation upon illicit act detection of the in-vehicle communication system 101 will be described with reference to FIG. 4.

Figure 4:
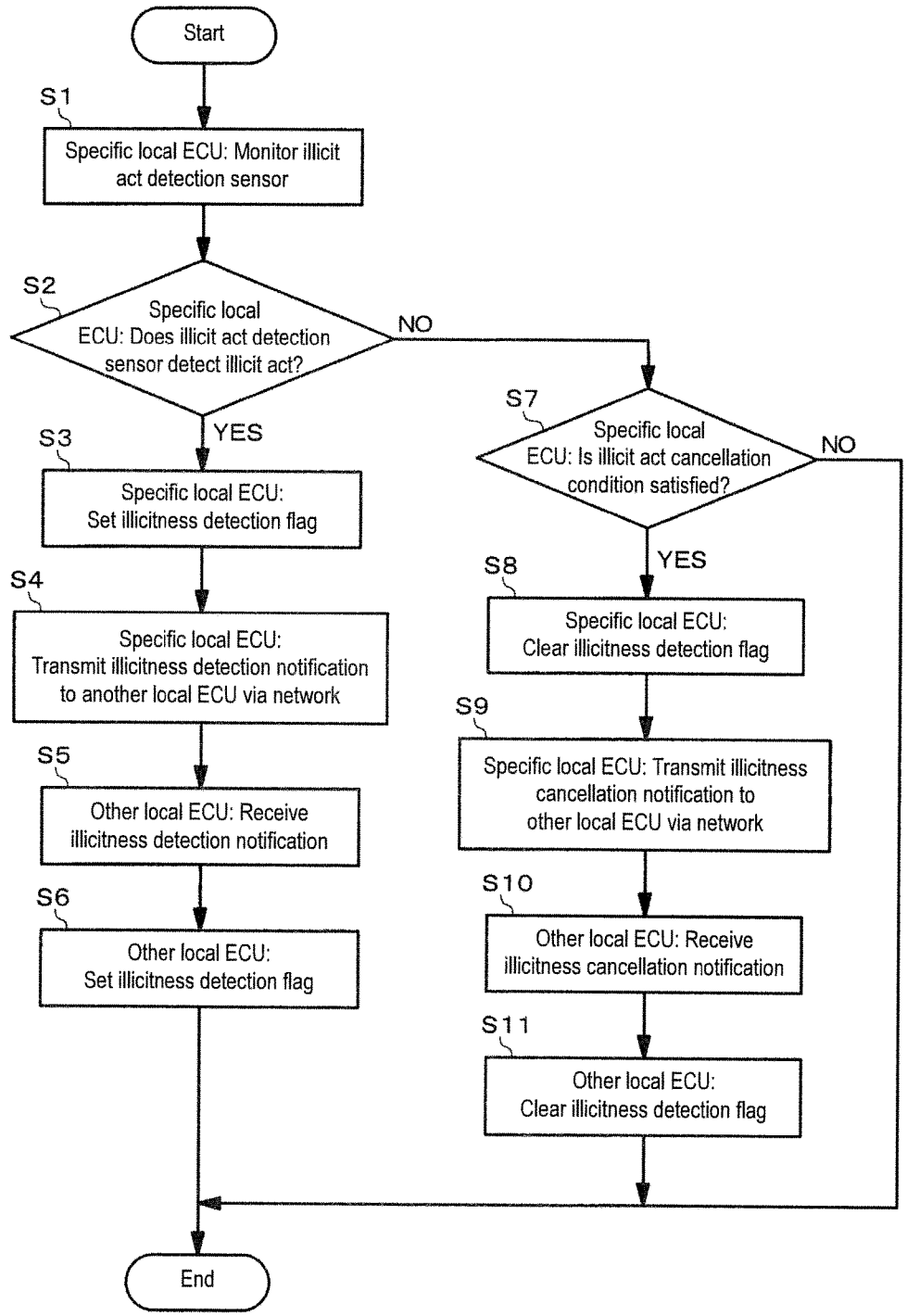
FIG. 4 is a flowchart illustrating operation upon illicit act detection of the in-vehicle communication system illustrated in FIG. 1.

FIG. 4 is a flowchart illustrating operation upon illicit act detection of the in-vehicle communication system 101. The illicit act detection sensor 3 or the local ECU 2 executes each process.

First, the controller 21 of the specific local ECU $2_{(1)}$ monitors output of the illicit act detection sensor 3 (step S1 in FIG. 4). For example, in a case where an illicit person performs an illicit act on the vehicle 31 in order to intrude into the vehicle 31, the illicit act detection sensor 3 detects the illicit act on the vehicle 31, and outputs a signal indicating the detection result to the local ECU $2_{(1)}$. When the controller 21 of the specific local ECU $2_{(1)}$ receives the output signal through the interface 24 for an in-vehicle device, the controller 21 of the specific local ECU $2_{(1)}$ determines that the illicit act detection sensor 3 detects an illicit act on the vehicle 31 (Yes in step S2 in FIG. 4).

Then, in the specific local ECU $2_{(1)}$, the controller 21 sets the illicitness detection flag 22*f* in the storage 22 (step S3 in FIG. 4). In addition, the controller 21 causes the communicator 23 for a network to transmit an illicitness detection notification indicating that an illicit act has been detected to other local ECUs 2 via the network of the bus 4A, 4B (step S4 in FIG. 4).

In each of the other local ECUs 2, when the communicator 23 for a network receives the illicitness detection notification via the network of the bus 4A, 4B (step S5 in FIG. 4), the controller 21 sets the illicitness detection flag 22*f* in the storage 22 (step S6 in FIG. 4).

In contrast, if no illicit act is performed by an illicit person on the vehicle 31, the illicit act detection sensor 3 does not detect an illicit act and does not output a signal indicating that an illicit act has been detected to the local ECU $2_{(1)}$. Therefore, unless the controller 21 of the specific local ECU $2_{(1)}$ receives the signal output from the illicit act detection sensor 3, the controller 21 of the specific local ECU $2_{(1)}$ determines that the illicit act detection sensor 3 does not detect an illicit act on the vehicle 31 (No in step S2 in FIG. 4).

In this case, in the specific local ECU $2_{(1)}$, the controller 21 checks whether or not a predetermined illicit act cancellation condition is satisfied (step S7 in FIG. 4).

Possible examples of the illicit act cancellation condition are passage of a certain period of time after the illicit act detection sensor 3 detects an illicit act, a success of authentication by the power supply authenticator 21*c* or the entry authenticator 21*e*, and reception of a predetermined cancellation command transmitted from the external device connected to the OBDII port 5. A condition other than the above conditions may be set as an illicit act cancellation condition.

In a case where the illicit act cancellation condition is satisfied (Yes in step S7 in FIG. 4), the controller 21 of the specific local ECU $2_{(1)}$ clears the illicitness detection flag 22*f* in the storage 22 (step S8 in FIG. 4). In addition, the controller 21 of the specific local ECU $2_{(1)}$ causes the communicator 23 for a network to transmit an illicitness cancellation notification to the other local ECUs 2 via the network of the bus 4A, 4B (step S9 in FIG. 4).

In each of the other local ECUs 2, when the communicator 23 for a network receives the illicitness cancellation notification via the network of the bus 4A, 4B (step S10 in FIG. 4), the controller 21 clears the illicitness detection flag 22*f* in the storage 22 (step S11 in FIG. 4).

Next, operation upon reprogramming of the in-vehicle communication system 101 will be described with reference to FIG. 5.

Figure 5:
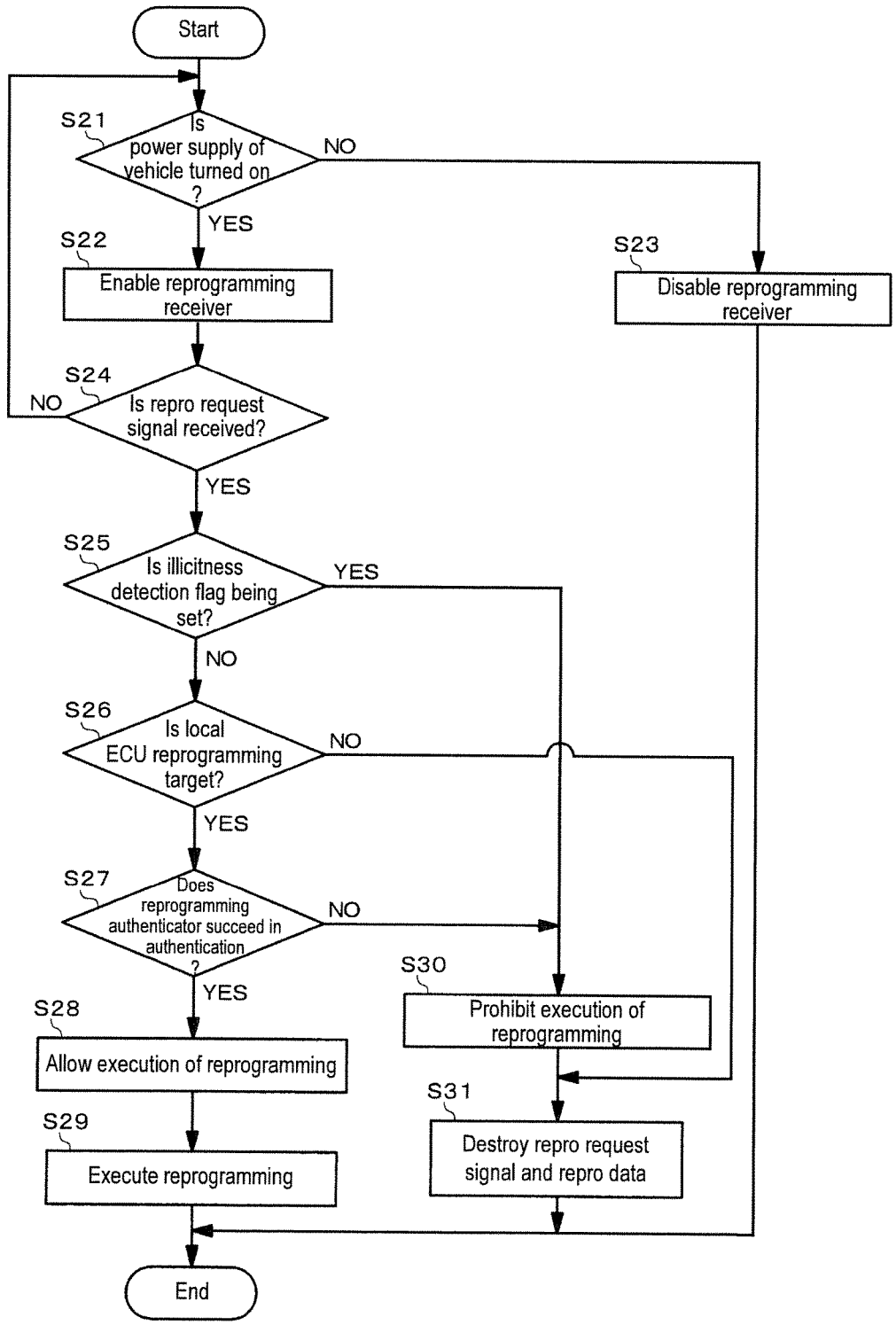
FIG. 5 is a diagram illustrating operation upon reprogramming of the in-vehicle communication system illustrated in FIG. 1.

FIG. 5 is a flowchart illustrating the operation upon reprogramming of the in-vehicle communication system 101. The local ECU 2 executes each process.

For example, a legitimate user such as a maintenance person of the vehicle 31 connects the reprogramming device 50 to the OBDII port 5 and turns on the power supply (ACC power supply or IG power supply) of the vehicle 31 by the power switch 41 or the portable device 60. Then, the legitimate user uses the reprogramming device 50 to transmit a repro request signal or repro data for reprogramming a target local ECU 2.

In a case where a normal operation as described above is performed, the power supply detector 21*d* detects the on state of the power supply of the vehicle 31 (Yes in step S21 in FIG. 5) in each local ECU 2. Therefore, the controller 21 enables the reprogramming receiver 23*a* (step S22 in FIG. 5). Thus, the reprogramming receiver 23*a* receives the repro request signal or the repro data transmitted from reprogramming device 50 via the OBDII port 5 and the network of the bus 4A, 4B. The repro request signal and the repro data are effectively used in subsequent processes.

In contrast, assume that an illicit person connects an illicit device to the OBDII port 5, and the illicit person uses the illicit device to transmit an illicit repro request signal or illicit repro data while the power supply of the vehicle 31 is turned off. In this case, in each local ECU 2, the power supply detector 21*d* detects the off state of the power supply of the vehicle 31 (No in step S21 in FIG. 5). Therefore, the controller 21 disables the reprogramming receiver 23*a* (step S23 in FIG. 5). Thus, even if the illicit device transmits the illicit repro request signal or the illicit repro data to each local ECU 2 via the OBDII port 5 and the network of the bus 4A, 4B, the reprogramming receiver 23*a* rejects the illicit repro request signal or the illicit repro data. Alternatively, after the reprogramming receiver 23*a* once receives the illicit repro request signal or the illicit repro data, the controller 21 may regard the illicit repro request signal or the illicit repro data as an invalid signal or invalid data and destroy the illicit repro request signal or the illicit repro data.

After step S22 in FIG. 5, if the reprogramming receiver 23*a* receives a repro request signal (Yes in step S24 in FIG. 5), the controller 21 of each local ECU 2 checks whether or not the illicitness detection flag 22*f* is set in the storage 22 (step S25 in FIG. 5).

In a case where the illicitness detection flag 22*f* is set in the storage 22 (Yes in step S25 in FIG. 5), the reprogramming controller 21*a* prohibits execution of reprogramming (step S30 in FIG. 5), and the controller 21 destroys the repro request signal and the repro data received by the reprogramming receiver 23*a* (step S31 in FIG. 5). Therefore, in a case where the illicit act detection sensor 3 detects in advance an illicit act on the vehicle 31, the local ECU 2 does not execute reprogramming.

In addition, in a case where the illicitness detection flag 22*f* is not set in the storage 22 (No in step S25 in FIG. 5), the controller 21 determines according to the repro request signal whether or not the local ECU 2 to which the controller 21 belongs is a reprogramming target (step S26 in FIG. 5).

In a case where the controller 21 determines that the local ECU 2 to which the controller 21 belongs is not the reprogramming target (No in step S26 in FIG. 5), the controller 21 destroys the repro request signal and the repro data received by the reprogramming receiver 23a (step S31 in FIG. 5). Thus, the local ECU 2 which is not the reprogramming target does not execute reprogramming.

In contrast, in a case where the controller 21 determines that the local ECU 2 to which the controller 21 belongs is the reprogramming target (Yes in step S26 in FIG. 5), the reprogramming authenticator 21b performs authentication according to the authentication code included in the repro request signal.

If the repro request signal received in step S24 in FIG. 5 is a legitimate signal transmitted from the authorized reprogramming device 50, the reprogramming authenticator 21b succeeds in authentication as described above (Yes in step S27 in FIG. 5). In this case, the reprogramming controller 21a allows execution of reprogramming (step S28 in FIG. 5), and the controller 21 executes reprogramming according to the repro request signal and the repro data received by the reprogramming receiver 23a (step S29 in FIG. 5). Therefore, reprogramming is legitimately executed in the local ECU 2 which is the reprogramming target.

In contrast, if the repro request signal received in step S24 in FIG. 5 is an illicit signal transmitted from an illicit device, the reprogramming authenticator 21b does not succeed in authentication as described above (No in step S27 in FIG. 5). In this case, the reprogramming controller 21a prohibits execution of reprogramming (step S30 in FIG. 5), and the controller 21 destroys the repro request signal and the repro data received by the reprogramming receiver 23a (step S31 in FIG. 5). Thus, the local ECU 2 does not execute reprogramming according to an illicit repro request signal or the like.

According to the first embodiment, in a case where the illicit act detection sensor 3 detects an illicit act on the vehicle 31, execution of reprogramming of the local ECU 2 is prohibited. Therefore, for example, when an illicit person performs an illicit act on the vehicle 31 in order to intrude into the vehicle 31, the illicit act detection sensor 3 detects the illicit act. Then, even if the illicit person connects an illicit device to the OBDII port 5 and uses the illicit device to transmit an illicit reprogramming request signal and data imitating the authorized reprogramming request signal and data, reprogramming of the local ECU 2 is prohibited. Therefore, illicit reprogramming in the local ECU 2 is not executed, and therefore the illicit reprogramming can be prevented.

In addition, in the first embodiment, the reprogramming authenticator 21b performs authentication according to the authentication code included in the repro request signal received by the reprogramming receiver 23a. Then, in a case where the reprogramming authenticator 21b does not succeed in authentication, the reprogramming controller 21a prohibits execution of reprogramming. In addition, in a case where the reprogramming authenticator 21b succeeds in authentication and the illicit act detection sensor 3 does not detect an illicit act, the reprogramming controller 21a allows execution of reprogramming. Therefore, only in a case where the local ECU 2 receives a legitimate repro request signal from the authorized reprogramming device 50 via the OBDII port 5 and the network of the bus 4A, 4B, reprogramming of the target local ECU 2 can be normally executed.

In addition, in the first embodiment, when the illicit act detection sensor 3 detects an illicit act, the specific local ECU $2_{(1)}$ sets the illicitness detection flag 22f in the storage 22 inside, and transmits an illicitness detection notification to the other local ECUs $2_{(2)}$ to $2_{(7)}$ via the networks of the buses 4A, 4B. When each of the other local ECUs $2_{(2)}$ to $2_{(7)}$ receives the illicitness detection notification, each of the other local ECUs $2_{(2)}$ to $2_{(7)}$ sets the illicitness detection flag 22f in the storage 22 inside. Therefore, all the local ECUs 2 on the networks of the buses 4A, 4B can recognize that the illicit act has been performed on the vehicle 31 and can record the illicit act.

Then, in each local ECU 2, when the reprogramming receiver 23a receives a repro request signal, execution of reprogramming is prohibited after it is confirmed that the illicitness detection flag 22f is set or that the reprogramming authenticator 21b does not succeed in authentication. Therefore, illicit reprogramming can be prevented. In addition, in each local ECU 2, execution of reprogramming is allowed after it is confirmed that the illicitness detection flag 22f is not set and that the reprogramming authenticator 21b has succeeded in authentication. Then, in the target local ECU 2, reprogramming is executed according to the repro request signal and the repro data received by the reprogramming receiver 23a. Therefore, reprogramming can be legitimately executed.

In the first embodiment, in each local ECU 2, the power supply authenticator 21c performs authentication according to the operation of the power switch 41 or the signal from the portable device 60. Only when the authentication has succeeded, the power supply of the vehicle 31 is turned on. Then, the reprogramming receiver 23a is enabled only when the power supply detector 21d detects the on state of the power supply of the vehicle 31. Therefore, if a legitimate user of the vehicle 31 legitimately turns on the power supply of the vehicle 31 and then causes the reprogramming device 50 connected to the OBDII port 5 to transmit a repro request signal and repro data, the reprogramming receiver 23a effectively receives the repro request signal and the repro data in the local ECU 2. According to the repro request signal and the repro data, reprogramming of the target local ECU 2 can be legitimately executed. The likelihood that an illicit person will legitimately turn on the power supply of the vehicle 31 is low. Therefore, each local ECU 2 can invalidate an illicit repro request signal and illicit repro data that an illicit person transmits by using an illicit device connected to the OBDII port 5 in a state where the power supply of the vehicle 31 is turned off. Thus, illicit reprogramming of the local ECU 2 can be prevented.

In addition, in the first embodiment, the illicit act detection sensor 3 detects an illicit act on the vehicle 31 which may be a theft of the vehicle 31. Therefore, before each local ECU 2 receives a repro request signal or the like, the illicit act detection sensor 3 detects an illicit act which may be a theft of the vehicle 31, and execution of reprogramming is prohibited. Thus, illicit reprogramming can be more effectively prevented.

Furthermore, in the first embodiment, the illicitness detection flag 22f set in each local ECU 2 is automatically cleared when the predetermined cancellation condition is satisfied. Therefore, in a case where the illicit act detection sensor 3 detects an illicit act and then a legitimate user of the vehicle 31 uses the reprogramming device 50 to reprogram the target local ECU 2, the target local ECU 2 can receive a legitimate repro request signal and legitimate repro data from the reprogramming device 50, and reprogramming of the target local ECU 2 can be legitimately executed according to the legitimate repro request signal and the legitimate repro data.

Note that as another example, a maintenance person may operate the reprogramming device 50 to manually clear the illicitness detection flag 22f that is set.

Next, a configuration of an in-vehicle communication system 102 according to a second embodiment will be described with reference to FIGS. 6 and 7.

Figure 6:
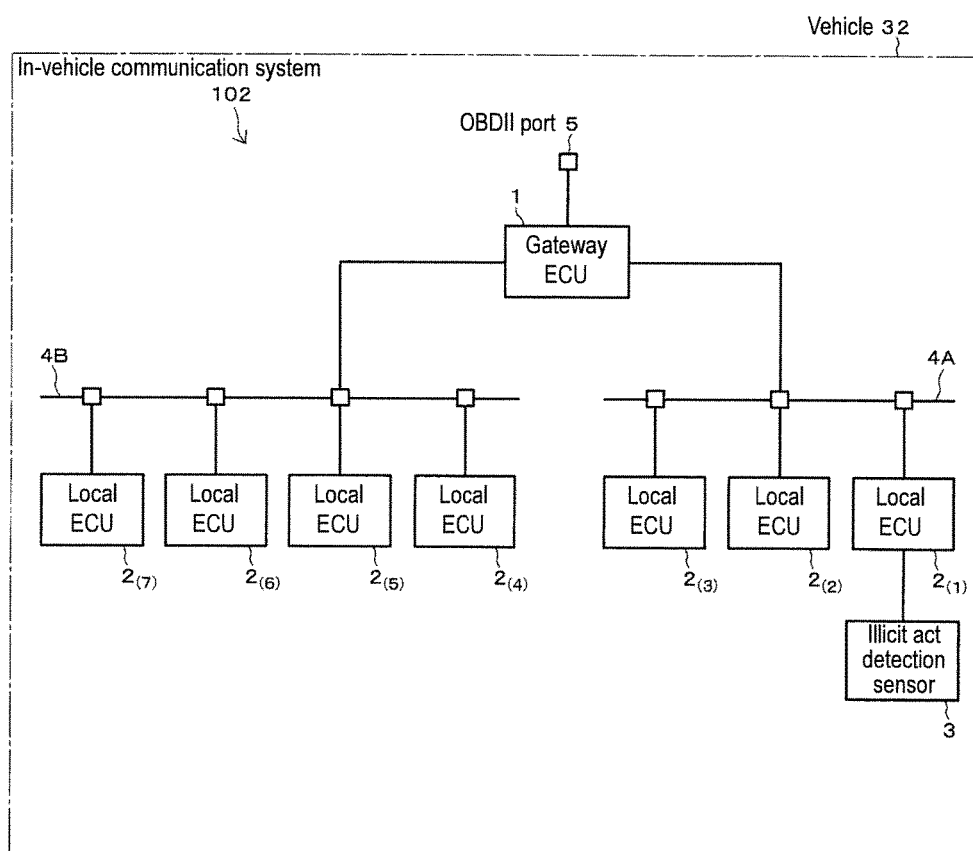
FIG. 6 is a configuration diagram of an in-vehicle communication system according to one or more embodiments of the disclosure.

FIG. 6 is a configuration diagram of the in-vehicle communication system 102. The in-vehicle communication system 102 is mounted on a vehicle 32 configured of, for example, a four-wheeled automobile. The in-vehicle communication system 102 includes a gateway ECU 1, a plurality of local ECUs $2_{(1)}$ to $2_{(7)}$, an illicit act detection sensor 3, and an OBDII port 5.

As illustrated in FIG. 6, each local ECU 2 is connected to a network of each of a plurality of buses 4A, 4B configured in the vehicle 32. In addition, similarly to the first embodiment, each local ECU 2 controls operation of an in-vehicle device.

The single common gateway ECU 1 is connected to the networks of the buses 4A, 4B. The gateway ECU 1 is connected to a predetermined connection node of each of the buses 4A, 4B. The gateway ECU 1 manages communication between the local ECUs 2. The gateway ECU 1 not only manages communication within an identical network but also manages communication between different networks.

The gateway ECU 1 communicates with each local ECU 2 via the network of the bus 4A, 4B, and transmits and receives information to and from each local ECU 2. During communication between the local ECUs 2 connected to an identical network, information transmitted from any of the local ECUs 2 may be directly received by the other local ECU 2 or may be received by the other local ECU 2 via the gateway ECU 1. During communication between the local ECUs 2 connected to different networks, information transmitted from any of the local ECUs 2 is received by the other local ECU 2 via the gateway ECU 1. That is, the local ECUs 2 can communicate with each other directly or via the gateway ECU 1.

During communication between the local ECUs 2 via the gateway ECU 1, the gateway ECU 1 filters information received from any of the local ECUs 2 and transfers the filtered information to the other local ECU 2, or excludes (does not transmit and destroys) the filtered information.

Communication protocols of the plurality of local ECUs 2 connected to the identical network are identical. However, communication protocols of the plurality of local ECUs 2 connected to different networks may be identical or different. In a case where the communication protocols of the plurality of local ECUs 2 connected to different networks are different, the gateway ECU 1 converts the communication protocol upon communication between the local ECUs 2 connected to different networks.

Filtering processing and/or communication protocol conversion processing executed by the gateway ECU 1 as described above are collectively referred to as gateway processing. The gateway ECU 1 is an example of a "communication management device" according to one or more embodiments of the disclosure.

Similarly to the first embodiment, the illicit act detection sensor 3 is connected to a specific local ECU $2_{(1)}$. The OBDII port 5 is not connected to the networks of the buses 4A, 4B but is connected to the gateway ECU 1.

Figure 7:
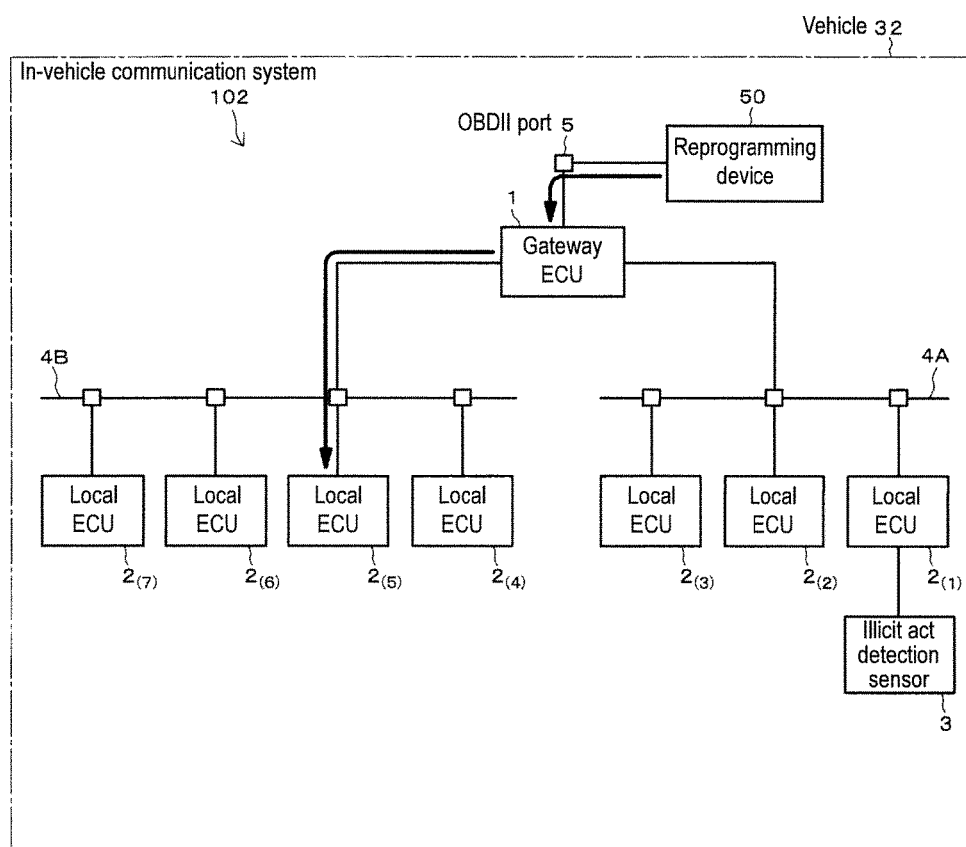
FIG. 7 is a configuration diagram upon reprogramming of the in-vehicle communication system illustrated in FIG. 6.

FIG. 7 is a configuration diagram upon reprogramming of the in-vehicle communication system 102. By connecting the reprogramming device 50 to the OBDII port 5, the reprogramming device 50 and the gateway ECU 1 can communicate with each other via the OBDII port 5. In addition, the reprogramming device 50 and the local ECU 2 can communicate with each other via the OBDII port 5, the gateway ECU 1, and the network of the bus 4A, 4B.

The reprogramming device 50 transmits a repro request signal and repro data to the gateway ECU 1 via the OBDII port 5. When the gateway ECU 1 receives the repro request signal and the repro data, the gateway ECU 1 transfers the repro request signal and the repro data to each local ECU 2 via the network of the bus 4A, 4B. At that time, the gateway ECU 1 may perform gateway processing on the repro request signal and the repro data.

Each local ECU 2 receives the repro request signal and the repro data via the network of the bus 4A, 4B. Then, according to information included in the repro request signal, each local ECU 2 determines whether or not the local ECU 2 itself is a reprogramming target. The local ECU 2 that determines that the local ECU 2 itself is the reprogramming target executes reprogramming according to the repro request signal and repro data received by the local ECU 2.

In FIG. 7, an arrow indicates a reprogramming path from the reprogramming device 50 to the local ECU $2_{(5)}$ as a representative example.

Next, configurations of the gateway ECU 1 and the local ECU 2 of the in-vehicle communication system 102 will be described with reference to FIG. 8.

Figure 8:
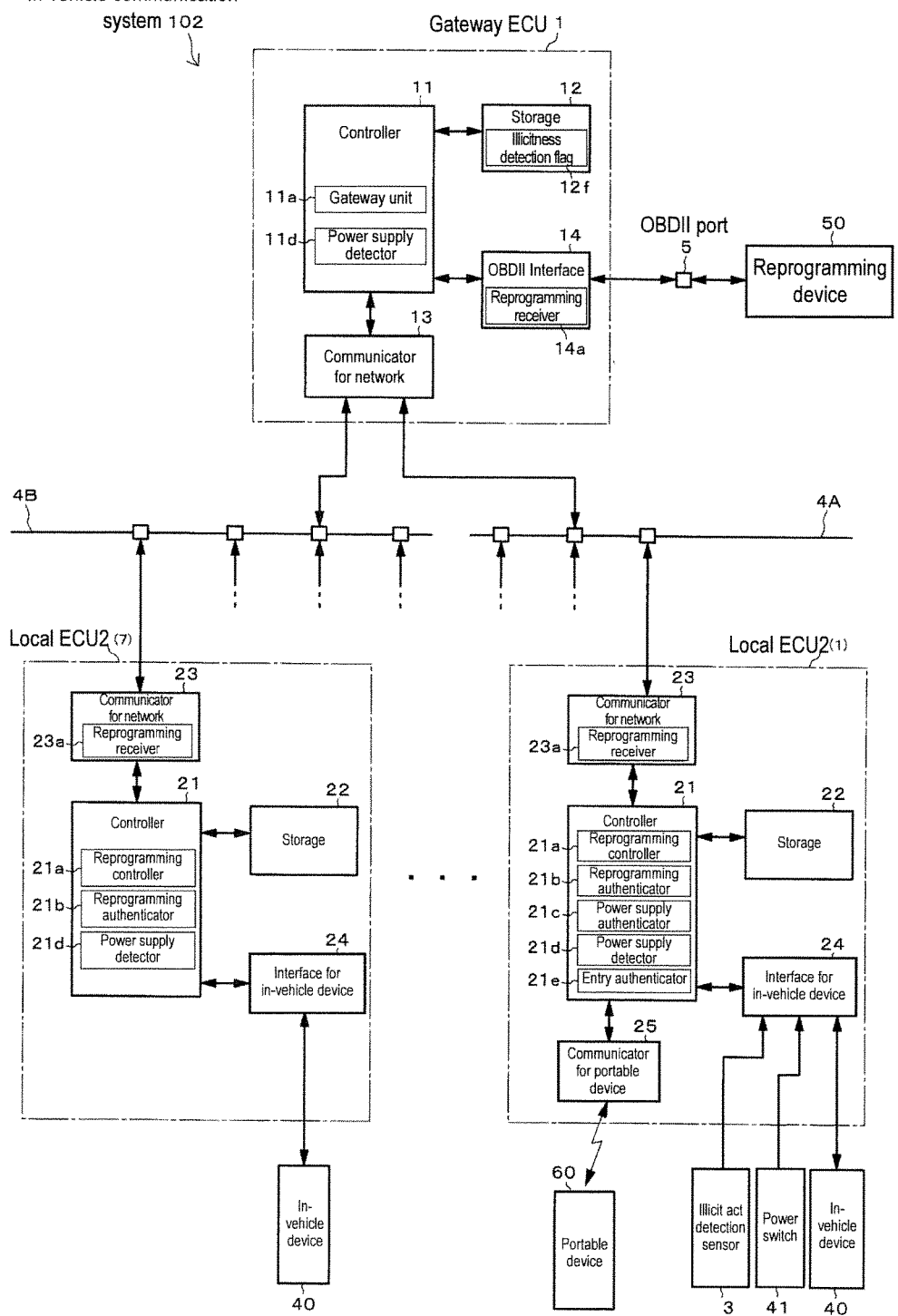
FIG. 8 is a configuration diagram of a gateway ECU and a local ECU illustrated in FIG. 6.

FIG. 8 is a configuration diagram of the gateway ECU 1 and the local ECUs 2 of the in-vehicle communication system 102. Note that even though the local ECUs $2_{(2)}$ to $2_{(6)}$ are not illustrated in FIG. 8, the configurations of the local ECUs $2_{(2)}$ to $2_{(6)}$ are similar to the configuration of the local ECU $2_{(7)}$.

The gateway ECU 1 includes a controller 11, a storage 12, a communicator 13 for a network, and an OBDII interface 14.

The controller 11 is configured of a CPU, a memory, and the like. The controller 11 includes a gateway unit 11a and a power supply detector 11d.

The storage 12 is configured of a nonvolatile memory. The storage 12 stores in advance information on the network of each of the buses 4A, 4B, ID (identification information) of each local ECU 2 connected to the network of the bus 4A, 4B, ID of the gateway ECU 1, and the like. The controller 11 reads information from the storage 12 and stores information in the storage 12.

In a predetermined storage area of the storage 12, an illicitness detection flag 12f is provided for recording that there has been an illicit act on the vehicle 32. The controller 11 sets or clears the illicitness detection flag 12f.

The communicator 13 for a network is configured of a circuit for communicating over the network of the bus 4A or the bus 4B. The controller 11 causes the communicator 13 for a network to transmit and receive a signal (including data and information) or the like to and from each local ECU 2 via the network of the bus 4A, 4B. In addition, the controller 11 causes the communicator 13 for a network to transfer a signal or the like received from any of the local ECUs 2 to another local ECU 2 via the network of the bus 4A, 4B.

A gateway unit 11a of the controller 11 performs gateway processing on a signal or the like that the communicator 13 for a network receives from any of the local ECUs 2 during communication between the local ECUs 2 via the gateway ECU 1.

Specifically, the gateway unit 11a filters a signal or the like that the communicator 13 for a network receives from any of the local ECUs 2, and determines whether to transmit the signal or the like to another local ECU 2. In a case where the gateway unit 11a determines to transmit the signal or the like received from any of the local ECUs 2, the gateway unit 11a causes the communicator 13 for a network to transmit the signal or the like to the other local ECU 2 (transfer processing). In addition, in a case where the gateway unit 11a determines not to transmit the signal or the like received from any of the local ECUs 2, the gateway unit 11a does not transmit the signal or the like to the other local ECU 2 and destroys the information (exclusion processing).

In addition, during communication between the local ECUs 2 having different communication protocols, the gateway unit 11a converts the communication protocol of a signal that the communicator 13 for a network receives from any of the local ECUs 2 into a communication protocol that the other local ECU 2 can receive (communication protocol conversion processing).

The OBDII interface 14 is configured of a circuit for communicating with an external device via the OBDII port 5. The OBDII interface 14 includes a reprogramming receiver 14a.

The controller 11 causes the reprogramming receiver 14a to receive the repro request signal and the repro data from the reprogramming device 50 connected to the OBDII port 5 via the OBDII port 5. In addition, the controller 11 can also transmit a signal or the like through the OBDII interface 14 to the reprogramming device 50 via the OBDII port 5, the reprogramming device 50 being connected to the OBDII port 5.

Furthermore, the controller 11 causes the communicator 13 for a network to transfer the repro request signal and the repro data received by the reprogramming receiver 14a to the local ECU 2 via the network of the bus 4A, 4B. At that time, the gateway unit 11a may perform gateway processing on the repro request signal and the repro data received by the reprogramming receiver 14a.

The power supply detector 11d of the controller 11 detects on and off states of the power supply of the vehicle 32 according to an operation state of a relay on a power supply line (not illustrated) of the vehicle 32. Alternatively, the power supply detector 11d may detect on and off states of the power supply of the vehicle 32 when the communicator 13 for a network receives the detection result of the power supply detector 21d of any of the local ECUs 2 from the local ECU 2 via the network of the bus 4A, 4B.

The configuration of the local ECU 2 in FIG. 8 is similar to the configuration (FIG. 3) of the first embodiment except that an illicitness detection flag is not provided in the storage 22. Therefore, for example, the power supply of the vehicle 32 is switched off from on in a case where the power supply authenticator 21c of the local ECU $2_{(1)}$ succeeds in authenticating the ID of the portable device 60 according to an on-operation of the power switch 41 or a power-on signal from the portable device 60.

Next, operation upon illicit act detection of the in-vehicle communication system 102 will be described with reference to FIG. 9.

Figure 9:
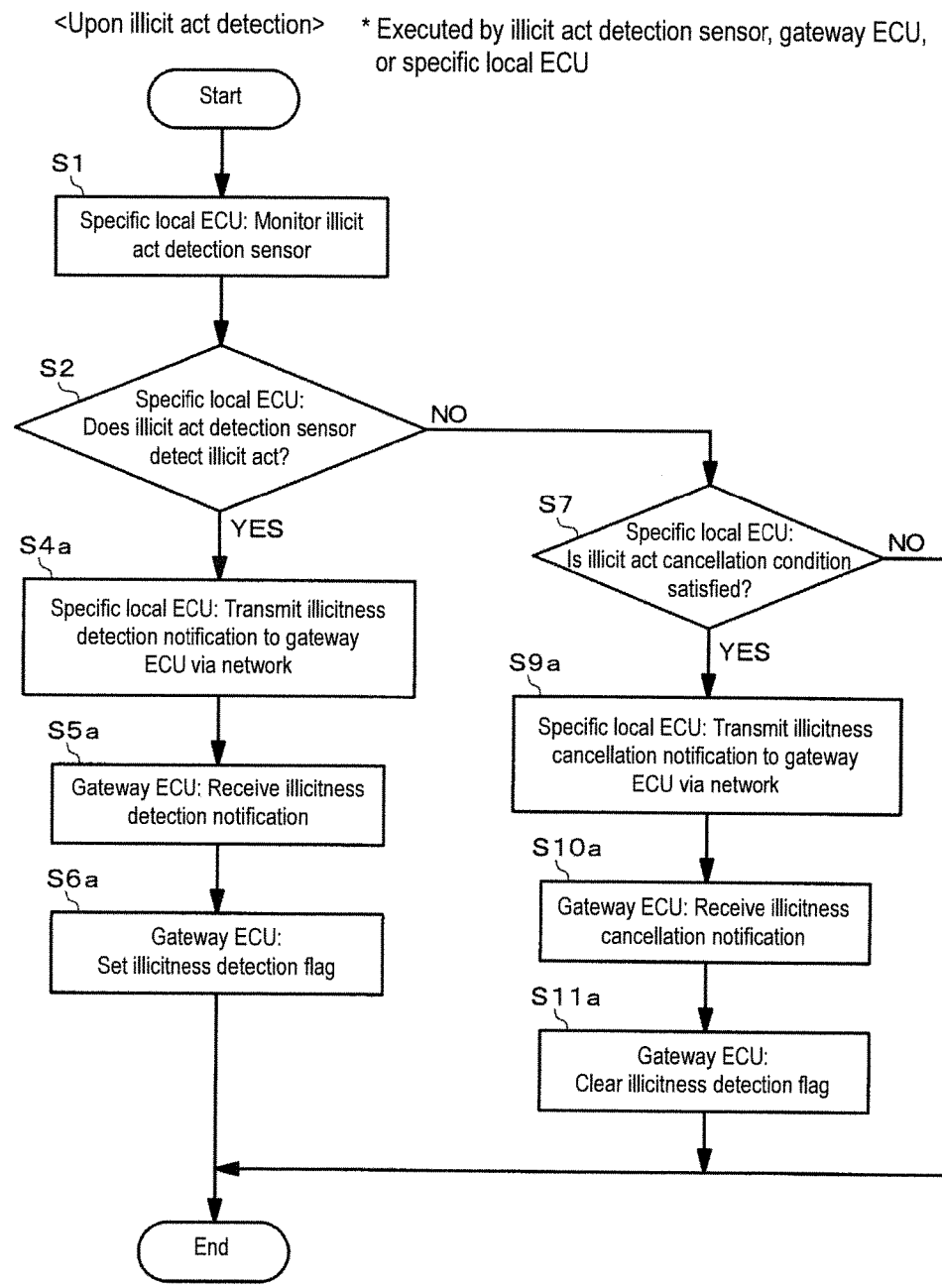
FIG. 9 is a flowchart illustrating operation upon illicit act detection of the in-vehicle communication system illustrated in FIG. 6.

FIG. 9 is a flowchart illustrating operation upon illicit act detection of the in-vehicle communication system 102. The illicit act detection sensor 3, the gateway ECU 1, or the specific local ECU $2_{(1)}$ executes each process.

First, the controller 21 of the specific local ECU $2_{(1)}$ monitors output of the illicit act detection sensor 3 (step S1 in FIG. 9). If the illicit act detection sensor 3 detects an illicit act on the vehicle 32, the illicit act detection sensor 3 outputs a signal indicating the detection result to the specific local ECU $2_{(1)}$. When the interface 24 for an in-vehicle device of the specific local ECU $2_{(1)}$ receives the signal output from the illicit act detection sensor 3, the controller 21 determines that the illicit act detection sensor 3 detects an illicit act on the vehicle 32 (Yes in step S2 in FIG. 9).

Then, the controller 21 of the specific local ECU $2_{(1)}$ causes the communicator 23 for a network to transmit an illicitness detection notification indicating that an illicit act has been detected to the gateway ECU 1 via the network of the bus 4A, 4B (step S4a in FIG. 9).

In the gateway ECU 1, when the communicator 13 for a network receives the illicitness detection notification via the network of the bus 4A, 4B (step S5a in FIG. 9), the controller 11 sets the illicitness detection flag 12f in the storage 12 (step S6a in FIG. 9).

In contrast, in the specific local ECU $2_{(1)}$, if the controller 21 determines that the illicit act detection sensor 3 does not detect an illicit act on the vehicle 31 (No in step S2 in FIG. 9), the controller 21 then checks whether or not a predetermined illicit act cancellation condition is satisfied (step S7 in FIG. 9).

Then, in a case where the predetermined illicit act cancellation condition is satisfied (Yes in step S7 in FIG. 9), the controller 21 of the specific local ECU $2_{(1)}$ causes the communicator 23 for a network to transmit an illicitness cancellation notification to the gateway ECU 1 via the network of the bus 4A, 4B (step S9a in FIG. 9).

In the gateway ECU 1, when the communicator 13 for a network receives the illicitness cancellation notification via the network of the bus 4A, 4B (step S10a in FIG. 9), the controller 11 clears the illicitness detection flag 12f in the storage 12 (step S11a in FIG. 9).

Next, operation upon reprogramming of the in-vehicle communication system 102 will be described with reference to FIG. 10.

Figure 10:
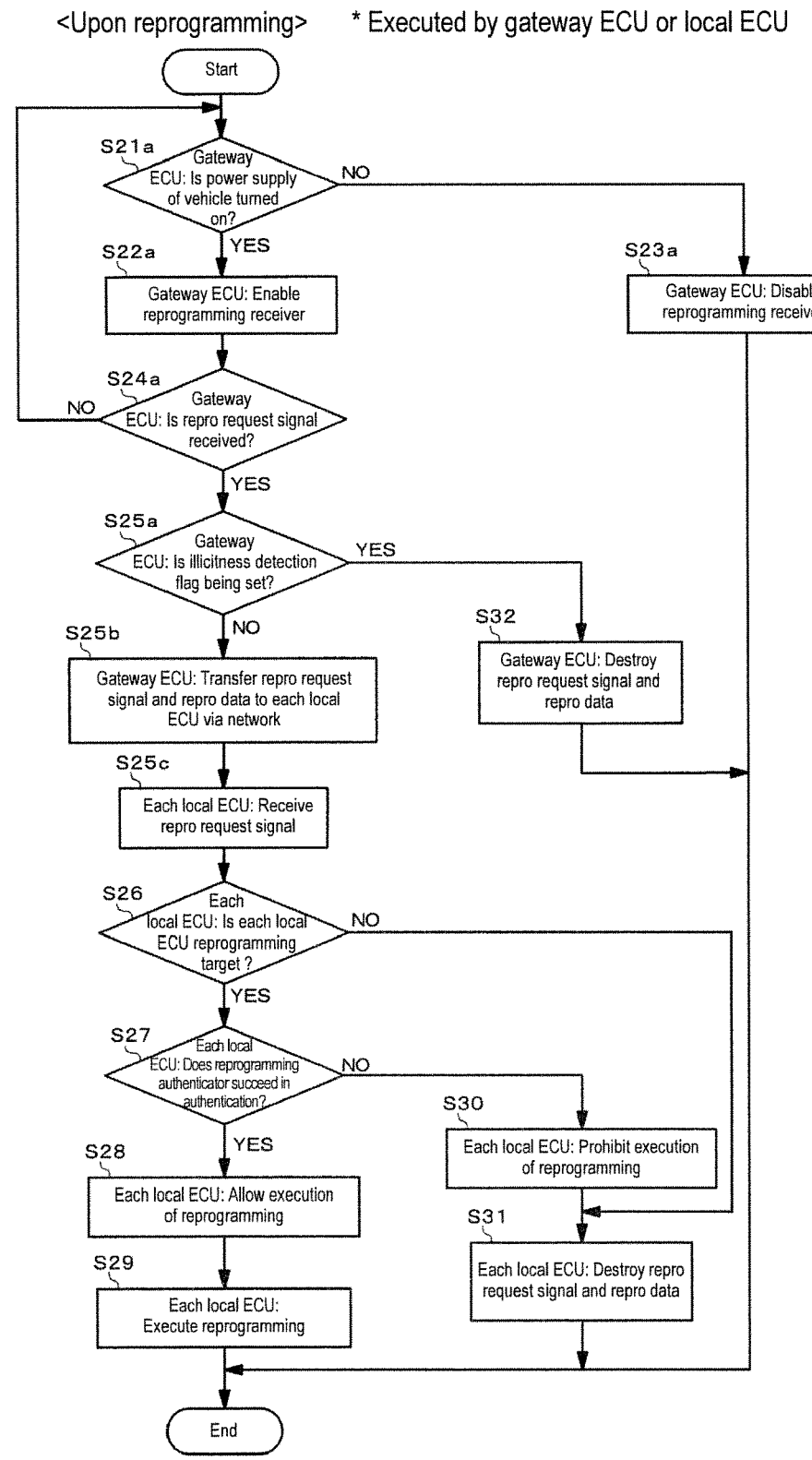
FIG. 10 is a diagram illustrating operation upon reprogramming of the in-vehicle communication system illustrated in FIG. 6.

FIG. 10 is a flowchart illustrating the operation upon reprogramming of the in-vehicle communication system 102. The gateway ECU 1 or the local ECU 2 executes each process.

In the gateway ECU 1, in a case where the power supply detector 11d detects an on state of the power supply of the vehicle 32 (Yes in step S21a in FIG. 10), the controller 11 enables the reprogramming receiver 14a (step S22a in FIG. 10). In a case where the power supply detector 11d detects an off state of the power supply of the vehicle 32 (No in step S21a in FIG. 10), the controller 11 disables the reprogramming receiver 14a (step S23a in FIG. 10).

After step S22a in FIG. 10, in the gateway ECU 1, if the reprogramming receiver 14a receives a repro request signal (Yes in step S24a in FIG. 10), the controller 11 checks whether or not the illicitness detection flag 12f is set in the storage 12 (step S25a in FIG. 10).

In a case where the illicitness detection flag 12f is set in the storage 12 (Yes in step S25a in FIG. 10), the controller 11 destroys the repro request signal and the repro data received by the reprogramming receiver 14a without transferring the repro request signal and the repro data to the local ECU 2 (step S32 in FIG. 10). Therefore, in a case where the illicit act detection sensor 3 detects in advance an illicit act on the vehicle 32, the local ECU 2 does not execute reprogramming.

In addition, in a case where the illicitness detection flag 12f is not set in the storage 12 (No in step S25a in FIG. 10), the controller 11 causes the communicator 13 for a network to transmit the repro request signal and the repro data received by the reprogramming receiver 14a to each local ECU 2 via the network of the bus 4A, 4B (step S25b in FIG. 10).

In each local ECU 2, the reprogramming receiver 23a of the communicator 23 for a network receives the repro request signal via the network of the bus 4A, 4B (step S25c in FIG. 10). Then, according to the repro request signal, the controller 21 determines whether or not the local ECU 2 to which the controller 21 belongs is a reprogramming target (step S26 in FIG. 10).

In a case where the controller 21 determines that the local ECU 2 to which the controller 21 belongs is not the reprogramming target (No in step S26 in FIG. 10), the controller 21 destroys the repro request signal and the repro data received by the reprogramming receiver 23a (step S31 in FIG. 10). In addition, in a case where the controller 21 determines that the local ECU 2 to which the controller 21 belongs is the reprogramming target (Yes in step S26 in FIG. 10), the reprogramming authenticator 21b performs authentication according to the authentication code included in the repro request signal.

In a case where the reprogramming authenticator 21b succeeds in authentication (Yes in step S27 in FIG. 10), the reprogramming controller 21a allows execution of reprogramming (step S28 in FIG. 10). Then, the controller 21 executes reprogramming according to the repro request signal and the repro data received by the reprogramming receiver 23a (step S29 in FIG. 10).

In contrast, in a case where the reprogramming authenticator 21b does not succeed in authentication (No in step S27 in FIG. 10), the reprogramming controller 21a prohibits execution of reprogramming (step S30 in FIG. 10). Then, the controller 21 destroys the repro request signal and the repro data received by the reprogramming receiver 23a (step S31 in FIG. 10). Thus, the local ECU 2 does not execute reprogramming according to an illicit repro request signal or the like.

According to the second embodiment, in a case where the illicit act detection sensor 3 detects an illicit act on the vehicle 32, the gateway ECU 1 destroys the repro request signal and the repro data received by the reprogramming receiver 14a. Therefore, reprogramming of the local ECU 2 is not executed. Therefore, for example, when an illicit person performs an illicit act on the vehicle 32 in order to intrude into the vehicle 32, the illicit act detection sensor 3 detects the illicit act. Then, even if the illicit person connects an illicit device to the OBDII port 5 and uses the illicit device to transmit an illicit reprogramming request signal and data, reprogramming of the local ECU 2 is not executed. Therefore, illicit reprogramming of the local ECU 2 can be prevented.

In addition, in the second embodiment, when the illicit act detection sensor 3 detects an illicit act, the specific local ECU $2_{(1)}$ transmits an illicitness detection notification to the gateway ECU 1 via the network of the bus 4A, 4B. When the gateway ECU 1 receives the illicitness detection notification, the gateway ECU 1 sets the illicitness detection flag 12f in the storage 12 inside. Therefore, the gateway ECU 1 can recognize that the illicit act has been performed on the vehicle 32 and can record the illicit act.

In addition, if the illicitness detection flag 12f is set when the gateway ECU 1 receives a repro request signal, the gateway ECU 1 destroys the repro request signal and repro data received by the reprogramming receiver 14a. Therefore, an illicit reprogramming of the local ECU 2 can be prevented. In contrast, if the illicitness detection flag 12f is not set, the gateway ECU 1 can transfer the repro request signal and the repro data received by the reprogramming receiver 14a to the local ECU 2 via the network of the bus 4A, 4B.

Then, in the local ECU 2, if the reprogramming authenticator 21b does not succeed in authentication when the local ECU 2 receives the repro request signal from the gateway ECU 1, the reprogramming controller 21a prohibits execution of reprogramming. Therefore, illicit reprogramming according to an illicit repro request signal can be prevented. In addition, if the reprogramming authenticator 21b succeeds in authentication, the reprogramming controller 21a allows execution of reprogramming. Then, in the target local ECU 2, reprogramming is executed according to the repro request signal and the repro data transferred from the gateway ECU 1. Therefore, reprogramming can be legitimately executed.

In addition, in the second embodiment, the power supply of the vehicle 32 is turned on only when the power supply authenticator 21c of the local ECU $2_{(1)}$ succeeds in authentication of the ID of the portable device 60. Then, in the gateway ECU 1, the reprogramming receiver 14a is enabled only when the power supply detector 11d detects the on state of the power supply of the vehicle 32. Therefore, for example, the likelihood that an illicit person will legitimately turn on the power supply of the vehicle 32 is low. Thus, the gateway ECU 1 can invalidate an illicit repro request signal and illicit repro data that an illicit person transmits by using an illicit device connected to the OBDII port 5 in a state where the power supply of the vehicle 32 is turned off, and illicit reprogramming of the local ECU 2 can be prevented.

Next, a configuration of an in-vehicle communication system 103 according to a third embodiment will be described with reference to FIGS. 11 and 12.

Figure 11:
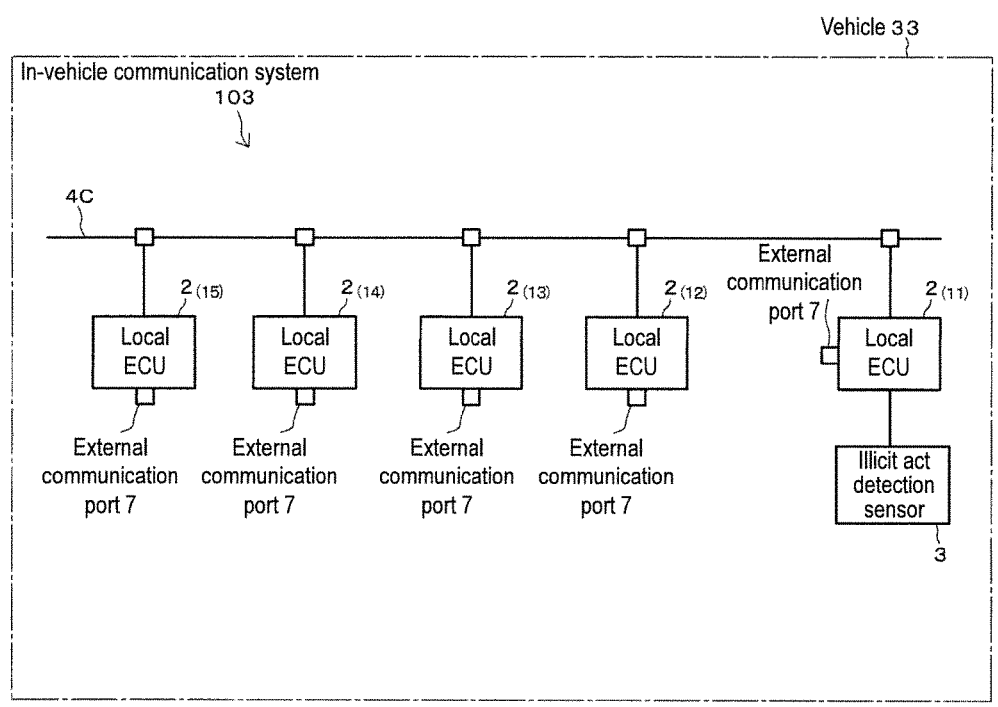
FIG. 11 is a configuration diagram of an in-vehicle communication system according to one or more embodiments of the disclosure.

FIG. 11 is a configuration diagram of the in-vehicle communication system 103. The in-vehicle communication system 103 is mounted on a vehicle 33 configured of, for example, a motorcycle. The in-vehicle communication system 103 includes a plurality of local ECUs $2_{(11)}$ to $2_{(15)}$, an illicit act detection sensor 3, and a plurality of external communication ports 7. Hereinafter, the local ECUs $2_{(11)}$ to $2_{(15)}$ are collectively referred to as local ECUs 2.

Each local ECU 2 is connected to a network of a bus 4C configured in the vehicle 33. Specifically, the local ECU 2 is connected to each predetermined connection node provided in the network of the bus 4C.

Each local ECU 2 controls each unit of the vehicle 33. Specifically, the local ECUs $2_{(12)}$ to $2_{(15)}$ are allocated to in-vehicle devices to be controlled such as a navigation device, a brake, a transmission, an engine, and the like mounted on the vehicle 33, and each of the local ECUs $2_{(12)}$ to $2_{(15)}$ controls operation of the corresponding in-vehicle device.

The local ECU $2_{(11)}$ controls operation of a device constituting an entry system mounted on the vehicle 33. For example, the local ECU $2_{(11)}$ monitors the power supply state and the security state of the vehicle 33 and wirelessly communicates with a portable device 60 (FIG. 13) registered in the vehicle 33. The illicit act detection sensor 3 is connected to the local ECU $2_{(11)}$.

Each local ECU 2 includes the external communication port 7. The external communication port 7 is a communication port to the outside, and is configured of a connector or the like. An external device such as a fault diagnosis device (not illustrated), or a reprogramming device 50 illustrated in FIG. 12 is connected to the external communication port 7 via a connector or a cable. By connecting the external device to the external communication port 7, the external device and the local ECU 2 can communicate with each other via the external communication port 7.

The local ECU 2 is an example of a "vehicle control device" according to one or more embodiments of the disclosure. In addition, the local ECU $2_{(11)}$ is an example of the "specific vehicle control device" according to one or more embodiments of the disclosure. The external communication port 7 is an example of the "communication port" according to one or more embodiments of the disclosure.

Figure 12:
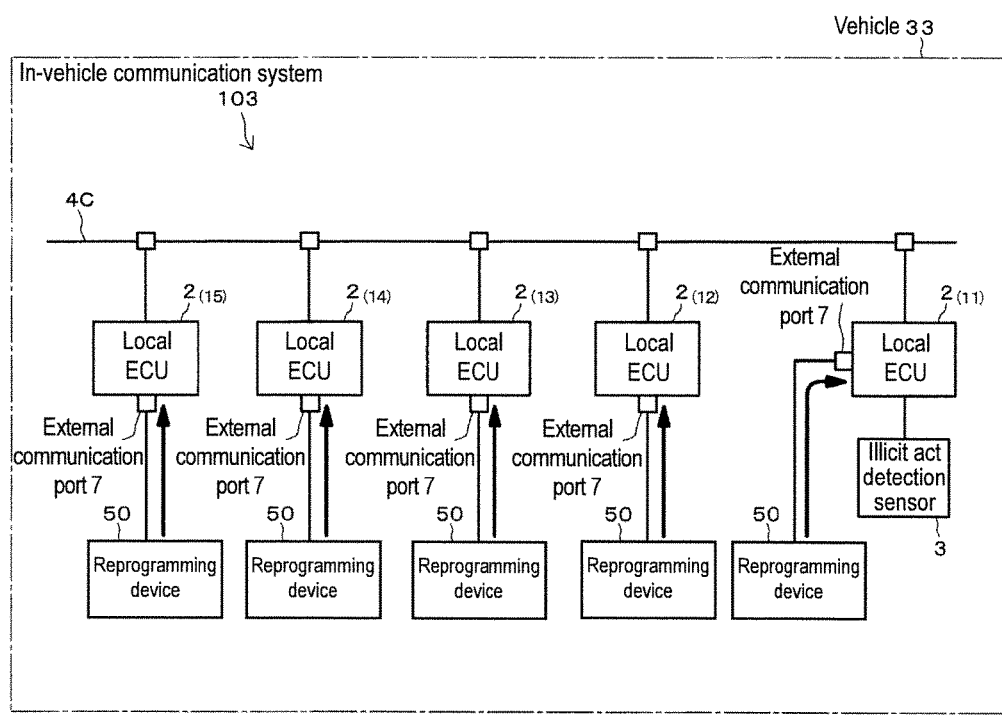
FIG. 12 is a configuration diagram upon reprogramming of the in-vehicle communication system illustrated in FIG. 11.

FIG. 12 is a configuration diagram upon reprogramming of the in-vehicle communication system 103. By connecting the reprogramming device 50 to any of the external communication ports 7, the local ECU 2 provided with the external communication port 7 and the reprogramming device 50 are electrically connected, and can communicate with each other via the external communication port 7.

The reprogramming device 50 transmits a repro request signal and repro data to the local ECU 2 which is a connection destination via the external communication port 7. The local ECU 2 which has received the repro request signal and the repro data from the reprogramming device 50 executes reprogramming according to the repro request signal and the repro data.

In FIG. 12, an arrow indicates a reprogramming path from each reprogramming device 50 to each local ECU 2. Note that FIG. 12 illustrates a plurality of reprogramming devices 50 correspondingly to the local ECUs 2; however, the number of reprogramming devices 50 may be one or two or more. However, when a plurality of reprogramming devices 50 is provided, reprogramming of two or more local ECUs 2 can be executed simultaneously.

Next, the configuration of the local ECU 2 of the in-vehicle communication system 103 will be described with reference to FIG. 13.

Figure 13:
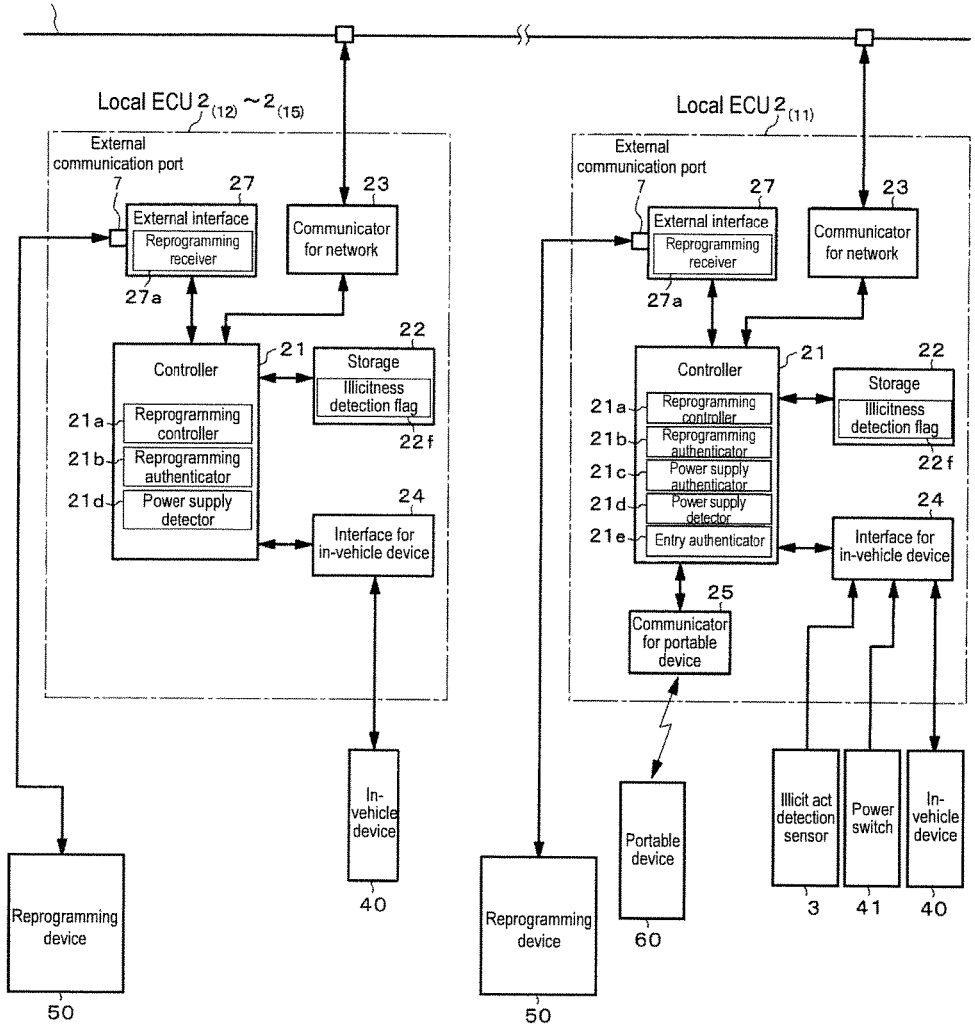
FIG. 13 is a configuration diagram of a local ECU illustrated in FIG. 11.

FIG. 13 is a configuration diagram of the local ECU 2 of the in-vehicle communication system 103. FIG. 13 separately illustrates the configuration of the local ECU $2_{(11)}$ and the configuration of each of the other local ECUs $2_{(12)}$ to $2_{(15)}$.

Each local ECU 2 includes a controller 21, a storage 22, a communicator 23 for a network, an interface 24 for an in-vehicle device, and an external interface 27. In addition to the above configuration, the local ECU $2_{(11)}$ includes a communicator 25 for a portable device.

The controller 21 of each local ECU 2 includes a reprogramming controller 21a, a reprogramming authenticator 21b, and a power supply detector 21d. In addition to the above configuration, the controller 21 of the local ECU $2_{(11)}$ includes a power supply authenticator 21c and an entry authenticator 21e.

The storage 22 stores in advance information on the network of the bus 4C and a software program, information, and the like for operating the local ECU 2 including the storage 22. The software program stored in the storage 22 is necessary for controlling the in-vehicle device 40 to be controlled, and can be rewritten by the reprogramming device 50. An illicitness detection flag 22f is provided in a predetermined storage area of the storage 22.

The communicator 23 for a network is configured of a circuit for communicating over the network of the bus 4C. The controller 21 of each local ECU 2 causes the communicator 23 for a network to transmit and receive a signal or the like to and from another local ECU 2 via the network of the bus 4C.

The interface 24 for an in-vehicle device is configured of a circuit for communicating with the in-vehicle device 40 to be controlled. In addition to the in-vehicle device 40, the illicit act detection sensor 3 and a power switch 41 are also connected to the interface 24 for an in-vehicle device of the local ECU $2_{(11)}$. The local ECU $2_{(11)}$ receives the detection result of the illicit act detection sensor 3 and an output signal corresponding to the operation of the power switch 41 through the interface 24 for an in-vehicle device.

The external interface 27 is configured of a circuit for communicating with an external device such as the reprogramming device 50. The external interface 27 includes the external communication port 7 and a reprogramming receiver 27a. As illustrated in FIG. 12, the controller 21 causes the reprogramming receiver 27a to receive a repro request signal and repro data from the reprogramming device 50 connected to the external communication port 7, via the external communication port 7. In addition, the controller 21 can also cause the communicator 23 for a network to transmit a signal or the like to the reprogramming device 50 via the external communication port 7.

The communicator 25 for a portable device of the local ECU $2_{(11)}$ is configured of a circuit for wirelessly communicating with the portable device 60 registered in the vehicle 33.

In the controller 21 of each local ECU 2, the reprogramming controller 21a allows or prohibits execution of reprogramming of the software program stored in the storage 22. The reprogramming authenticator 21b performs authentication according to the authentication code included in the repro request signal received by the reprogramming receiver 27a. The power supply detector 21d detects on and off states of the power supply of the vehicle 33 according to an operation state of a relay on a power supply line (not illustrated) of the vehicle 33. The controller 21 of the local ECU $2_{(11)}$ controls switching on and off of the power supply of the vehicle 33.

The power supply authenticator 21c provided in the controller 21 of the local ECU $2_{(11)}$ performs authentication for turning on the power supply of the vehicle 33. The power supply authenticator 21c performs authentication according to the on-operation of the power switch 41 or a power-on signal from the portable device 60. If the authentication succeeds, the power supply of the vehicle 33 is switched from off to on.

The entry authenticator 21e provided in the controller 21 of the local ECU $2_{(11)}$ authenticates the portable device 60 when a user enters (approaches or contacts) the vehicle 33. Specifically, the controller 21 of the local ECU $2_{(11)}$ causes the communicator 25 for a portable device to communicate with the portable device 60. Then, the entry authenticator 21e performs authentication according to authentication information (ID) included in the signal that the communicator 25 for a portable device 60 receives from the portable device 60. If the entry authenticator 21e succeeds in authentication, lights of the vehicle 33 are turned on or the engine of the vehicle 33 is started, for example.

A legitimate user of the vehicle 33 carries the portable device 60. Therefore, in a case where the power supply authenticator 21c or the entry authenticator 21e succeeds in authentication, it can be determined that the legitimate user is about to use the vehicle 33. In contrast, in a case where the power supply authenticator 21c or the entry authenticator 21e does not succeed in authentication, it can be determined that an illicit person not carrying the portable device 60 is trying to illicitly use the vehicle 33.

Next, operation of the in-vehicle communication system 103 will be described.

The operation of the in-vehicle communication system 103 upon illicit act detection is similar to the operation in the first embodiment illustrated in FIG. 4.

That is, if the illicit act detection sensor 3 detects an illicit act on the vehicle 33, the specific local ECU $2_{(11)}$ sets the illicitness detection flag 22f in the storage 22, and the communicator 23 for a network transmits an illicitness detection notification to the other local ECUs 2. When the communicator 23 for a network receives the illicitness detection notification, each of the other local ECUs 2 sets the illicitness detection flag 22f in the storage 22.

In contrast, if the illicit act detection sensor 3 does not detect an illicit act on the vehicle 33, the specific local ECU $2_{(11)}$ checks whether or not an illicit act cancellation condition is satisfied. If the illicit act cancellation condition is satisfied, the specific local ECU $2_{(11)}$ clears the illicitness detection flag 22f, and causes the communicator 23 for a network to transmit an illicitness cancellation notification to the other local ECUs 2. When the communicator 23 for a network receives the illicitness cancellation notification, each of the other local ECUs 2 clears the illicitness detection flag 22f.

The operation of the in-vehicle communication system 103 upon reprogramming is similar to the operation in the first embodiment illustrated in FIG. 5.

That is, in each local ECU 2, when the power supply detector 21d detects the on state of the power supply of the vehicle 33, the reprogramming receiver 27a is enabled. In contrast, when the power supply detector 21d detects the off state of the power supply of the vehicle 33, the reprogramming receiver 27a is disabled.

If the illicitness detection flag 22f is set in the storage 22 when the reprogramming receiver 27a which is enabled receives the repro request signal, the reprogramming controller 21a prohibits execution of reprogramming, and destroys the repro request signal and the repro data received by the reprogramming receiver 27a. In contrast, if the illicitness detection flag 22f is not set, it is determined according to the repro request signal whether or not the local ECU 2 in question is a local ECU 2 which is a reprogramming target. At that time, in the local ECU 2 that is not determined to be a reprogramming target, the repro request signal and the repro data received by the reprogramming receiver 27a are destroyed.

In contrast, in the local ECU 2 that is determined to be a reprogramming target, the reprogramming authenticator 21b performs authentication according to the repro request signal. If the reprogramming authenticator 21b succeeds in authentication, the reprogramming controller 21a allows execution of reprogramming. Therefore, in the local ECU 2 which is a reprogramming target, reprogramming is executed according to the repro request signal and the repro data received by the reprogramming receiver 27a.

In contrast, in the local ECU 2 which is a reprogramming target, if the reprogramming authenticator 21b does not succeed in authentication, the reprogramming controller 21a prohibits execution of reprogramming. Then, the repro request signal and the repro data received by the reprogramming receiver 27a are destroyed.

According to the third embodiment, when an illicit person performs an illicit act on the vehicle 33, the illicit act detection sensor 3 detects the illicit act, and execution of reprogramming of the local ECU 2 is prohibited. Then, even if the illicit person connects an illicit device to the external communication port 7 and uses the illicit device to transmit an illicit reprogramming request signal and data, the local ECU 2 does not execute reprogramming. Therefore, illicit reprogramming can be prevented.

In addition, in the third embodiment, when the illicit act detection sensor 3 detects an illicit act, the specific local ECU $2_{(11)}$ sets the illicitness detection flag 22f in the storage 22, and transmits an illicitness detection notification to the other local ECUs $2_{(12)}$ to $2_{(15)}$ via the network of the bus 4C. When each of the other local ECUs $2_{(12)}$ to $2_{(15)}$ receives the illicitness detection notification, each of the other local ECUs $2_{(12)}$ to $2_{(15)}$ sets the illicitness detection flag 22f in the storage 22. Therefore, all the local ECUs 2 on the network of the bus 4C can recognize that the illicit act has been performed on the vehicle 33 and can record the illicit act.

Then, in each local ECU 2, if the illicitness detection flag 22f is set or the reprogramming authenticator 21b does not succeed in authentication when the reprogramming receiver 27a receives a repro request signal, execution of reprogramming is prohibited. Therefore, illicit reprogramming can be prevented. In addition, in a case where the illicitness detection flag 22f is not set and the reprogramming authenticator 21b succeeds in authentication, execution of reprogramming is allowed. Therefore, in the target local ECU 2, reprogramming can be legitimately executed according to the repro request signal and the repro data received by the reprogramming receiver 27a.

One or more embodiments of the disclosure can adopt various embodiments other than an illustrative embodiment. For example, an illustrative embodiment illustrates an example in which the illicit act detection sensor 3 configured of the inclination sensor is used as the illicit act detector; however, the disclosure is not limited to this example. In addition to the above, for example, a door lock device, a steering wheel lock device, an alarm device, another sensor, or the like that can detect that the door or the steering wheel of a vehicle has been forcibly unlocked may be used as the illicit act detector. In addition, for example, a communication circuit or the like capable of detecting illicit entry in which the portable device 60 cannot be authenticated may be used as the illicit act detector. That is, the illicit act detector may be a device, a circuit, a sensor, or the like capable of detecting an illicit act that an illicit person performs on a vehicle.

In addition, an illustrative embodiment illustrates an example in which the illicit act detection sensor 3 is connected to the specific local ECU 2; however, the disclosure is not limited to this. The illicit act detector such as the illicit act detection sensor 3 may be connected to the plurality of local ECUs 2, may be connected to the gateway ECU 1, or may be connected to an existing domain on the network.

In addition, an illustrative embodiment illustrates an example in which the reprogramming controller 21a and the reprogramming authenticator 21b are provided in the local ECU 2; however, the disclosure is not limited to this. The reprogramming controller and the reprogramming authenticator may be provided in the gateway ECU 1. In this case, the gateway ECU 1 may transmit to each local ECU 2 control data (a reprogramming prohibition or permission command) of the reprogramming controller and the authentication result of the reprogramming authenticator.

The embodiments illustrated in FIGS. 5 and 10 illustrate an example in which after the presence or absence of the illicitness detection flag is checked, a determination is made as to whether or not the local ECU is a reprogramming target and authentication according to a repro request signal is subsequently performed. However, the disclosure is not limited to this. The execution order of processes such as checking of the presence or absence of the illicitness detection flag, determination as to whether or not the local ECU is a reprogramming target and authentication according to the repro request signal may be set as appropriate.

In addition, an illustrative embodiment illustrates an example in which the reprogramming device 50 transmits a repro request signal and repro data such that all the local ECUs 2 connected to the networks of the buses 4A, 4B can receive the repro request signal and the repro data. In addition, an illustrative embodiment illustrates an example in which the gateway ECU 1 transfers a repro request signal and repro data such that all the local ECUs 2 connected to the networks of the buses 4A, 4B can receive the repro request signal and the repro data. However, the disclosure is not limited to the above examples. For example, a repro request signal and repro data that the reprogramming device or the gateway ECU which is a transmission source transmits may include data (ID and identification information of a port, a bus, or the like) indicating the local ECU or the network which is the transmission destination (destination). Then, the local ECU that has received the repro request signal and the repro data may determine whether the repro request signal and the repro data are a repro request signal and repro data designating the local ECU itself according to the data of the transmission destination included in the repro request signal and the repro data. In addition, the gateway ECU that has received the repro request signal and the repro data may transfer information only to the local ECU or the network which is the transmission destination according to the data of the transmission destination included in the repro request signal and the repro data.

An illustrative embodiment illustrates a case where the local ECU 2 is used as the vehicle control device and the gateway ECU 1 is used as the communication management device. However, the disclosure is not limited to this. Another device which can perform communication may be used as the communication management device or the vehicle control device.

Furthermore, an illustrative embodiment illustrates an example in which the disclosure is applied to the in-vehicle communication systems 101 to 103 mounted on the vehicles 31 to 33 configured of a four-wheeled automobile or a motorcycle. However, the disclosure can also be applied to an in-vehicle communication system mounted on another vehicle such as a large-sized automobile.

While the invention has been described with reference to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An in-vehicle communication system comprising:
a plurality of vehicle control devices connected to a network of a vehicle, configured to communicate with each other, and configured to control an in-vehicle device to be controlled;
a communication port which is a communication port to an outside; and
a reprogramming receiver configured to receive a reprogramming request signal and data from an external device connected to the communication port,
wherein reprogramming for rewriting a software program of a target vehicle control device from among the plurality of vehicle control devices is executed according to the reprogramming request signal and the data received by the reprogramming receiver,
the in-vehicle communication system further comprising:
an illicit act detector configured to detect an illicit act on the vehicle; and
a reprogramming controller configured to prohibit execution of the reprogramming when the illicit act detector detects the illicit act.

2. The in-vehicle communication system according to claim 1, further comprising a reprogramming authenticator configured to perform authentication according to authentication information included in the reprogramming request signal received by the reprogramming receiver,
wherein the reprogramming controller prohibits execution of the reprogramming when the reprogramming authenticator does not succeed in authentication, and
wherein the reprogramming controller allows execution of the reprogramming when the illicit act detector does not detect the illicit act and the reprogramming authenticator succeeds in authentication.

3. The in-vehicle communication system according to claim 2,
wherein the communication port is connected to one of the network and each of the plurality of vehicle control devices,
wherein the reprogramming receiver, the reprogramming controller, and the reprogramming authenticator are provided in each of the plurality of vehicle control devices,
wherein the illicit act detector is connected to a specific vehicle control device from among the plurality of vehicle control devices,
wherein, when the illicit act detector detects the illicit act, the specific vehicle control device sets an illicitness detection flag in a storage inside and transmits an illicitness detection notification indicating that the illicit act is detected to another of the plurality of vehicle control devices via the network,
wherein, when the other of the plurality of vehicle control devices receives the illicitness detection notification, the other vehicle control device sets an illicitness detection flag in the storage inside,
wherein, when the reprogramming receiver receives the reprogramming request signal, in a state where one of a condition that the illicitness detection flag is set and a condition that the reprogramming authenticator does not succeed in authentication is satisfied, each of the plurality of vehicle control devices causes the reprogramming controller to prohibit execution of the reprogramming, and in a state where the illicitness detection flag is not set and the reprogramming authenticator succeeds in authentication, each of the plurality of vehicle control devices allows the reprogramming controller to execute the reprogramming, and executes the reprogramming according to the reprogramming request signal and the data received by the reprogramming receiver.

4. The in-vehicle communication system according to claim 2, further comprising
a communication management device connected to the network, configured to communicate with each of the plurality of vehicle control devices, configured to transfer a signal received from one of the plurality of vehicle control devices to another of the plurality of vehicle control devices, and configured to manage communication between the plurality of vehicle control devices,
wherein the communication port is connected to the communication management device,
wherein the reprogramming receiver is provided in the communication management device and each of the plurality of vehicle control devices,
wherein the reprogramming controller and the reprogramming authenticator are provided in each of the plurality of vehicle control devices, wherein the illicit act detector is connected to a specific vehicle control device from among the plurality of vehicle control devices, wherein when the illicit act detector detects the illicit act, the specific vehicle control device transmits an illicitness detection notification indicating that the illicit act is detected to the communication management device via the network, wherein when the communication management device receives the illicitness detection notification, the communication management device sets an illicitness detection flag in a storage inside, wherein when the reprogramming receiver receives the reprogramming request signal, in a state where the illicitness detection flag is set, the communication management device destroys the reprogramming request signal and the data received by the reprogramming receiver, and in a state where the illicitness detection flag is not set, the communication management device transfers the reprogramming request signal and the data received by the reprogramming receiver to each of the plurality of vehicle control devices via the network, and wherein when the reprogramming receiver receives the reprogramming request signal from the communication management device, in a state where the reprogramming authenticator does not succeed in authentication, each of the plurality of vehicle control devices causes the reprogramming controller to prohibit execution of the reprogramming, and in a state where the reprogramming authenticator succeeds in authentication, each of the plurality of vehicle control devices allows the reprogramming controller to execute the reprogramming and executes the reprogramming according to the reprogramming request signal and the data received by the reprogramming receiver.

5. The in-vehicle communication system according to claim 1, wherein a power supply of the vehicle is switched from off to on according to one of an operation of a power switch provided in the vehicle and a signal of an electronic key registered in the vehicle, the in-vehicle communication system further comprising a power supply detector configured to detect an on state and an off state of the power supply of the vehicle, wherein when the power supply detector detects the off state of the power supply of the vehicle, the reprogramming receiver is disabled, and wherein when the power supply detector detects the on state of the power supply of the vehicle, the reprogramming receiver is enabled.

6. The in-vehicle communication system according to claim 1, wherein the illicit act detector detects an illicit act on the vehicle with a possibility of theft.

7. The in-vehicle communication system according to claim 1, wherein the illicitness detection flag which is set is automatically cleared upon satisfaction of a predetermined cancellation condition.

8. A vehicle control device a plurality of which is connected to a network of a vehicle and communicates with each other, the vehicle control device controlling an in-vehicle device to be controlled, the vehicle control device comprising a reprogramming receiver configured to receive a reprogramming request signal and data from an external device connected to a communication port which is a communication port to an outside, wherein the vehicle control device executes reprogramming for rewriting a software program of the vehicle control device according to the reprogramming request signal and the data received by the reprogramming receiver, the vehicle control device further comprising a reprogramming controller configured to prohibit execution of the reprogramming when an illicit act detector provided in the vehicle detects an illicit act on the vehicle.

9. The vehicle control device according to claim 8, further comprising a reprogramming authenticator configured to perform authentication according to authentication information included in the reprogramming request signal received by the reprogramming receiver, wherein the illicit act detector is connected to a specific vehicle control device from among the plurality of vehicle control devices, wherein, when the illicit act detector detects the illicit act, the specific vehicle control device sets an illicitness detection flag in a storage inside and transmits an illicitness detection notification indicating that the illicit act is detected to another of the plurality of vehicle control devices via the network, wherein, when the other of the plurality of vehicle control devices receives the illicitness detection notification, the other of the plurality of vehicle control devices sets an illicitness detection flag in a storage inside, and wherein, when the reprogramming receiver receives the request signal, in a state where one of a condition that the illicitness detection flag is set and a condition that the reprogramming authenticator does not succeed in authentication is satisfied, each of the plurality of vehicle control devices causes the reprogramming controller to prohibit execution of the reprogramming, and in a state where the illicitness detection flag is not set and the reprogramming authenticator succeeds in authentication, each of the plurality of vehicle control devices allows the reprogramming controller to execute the reprogramming, and executes the reprogramming according to the reprogramming request signal and the data received by the reprogramming receiver.

10. A communication management device connected to a network of a vehicle, communicating with a plurality of vehicle control devices connected to the network, transferring a signal received from one of the plurality of vehicle control devices to another of the plurality of vehicle control devices, and managing communication between the plurality of vehicle control devices, the communication management device comprising a reprogramming receiver configured to receive a request signal and data for executing reprogramming for rewriting a software program of each of the plurality of vehicle control devices from an external device connected to a communication port which is a communication port to an outside, wherein the communication management device transfers the request signal and the data received by the reprogramming receiver to each of the plurality of vehicle control devices, and wherein when an illicit act detector provided in the vehicle detects an illicit act on the vehicle, the communication management device destroys the request signal and the data received by the reprogramming receiver without transferring the request signal and the data to each of the plurality of vehicle control devices in order to prohibit execution of the reprogramming.

\* \* \* \* \*